(12) United States Patent
Donlon et al.

(10) Patent No.: US 12,473,439 B2
(45) Date of Patent: Nov. 18, 2025

(54) PAINT TINTING ADJUVANT WITH SICCATIVE FOR LIQUID COLORANT SYSTEM

(71) Applicant: SWIMC LLC, Cleveland, OH (US)

(72) Inventors: Jacob S. Donlon, Cleveland, OH (US); Mark W. Ellsworth, Cleveland, OH (US); Patricia Olofsson-Elkow, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 560 days.

(21) Appl. No.: 16/923,267

(22) Filed: Jul. 8, 2020

(65) Prior Publication Data
US 2022/0010148 A1 Jan. 13, 2022

(51) Int. Cl.
*C09D 7/80* (2018.01)
*C08K 3/08* (2006.01)
(Continued)

(52) U.S. Cl.
CPC ............... *C09D 7/80* (2018.01); *C08K 3/08* (2013.01); *C08K 3/22* (2013.01); *C08K 9/04* (2013.01);
(Continued)

(58) Field of Classification Search
CPC .... C08K 2003/0812; C08K 2003/0825; C08K 2003/0843; C08K 2003/0856; C08K 2003/0893; C08K 2003/2241; C08K 3/011; C08K 3/08; C08K 3/10; C08K 3/22; C08K 9/04; C09D 153/00; C09D 167/00; C09D 167/08; C09D 7/45; C09D 7/61; C09D 7/63; C09D 7/80; F26B 15/00; F26B 2210/16
See application file for complete search history.

(56) References Cited

U.S. PATENT DOCUMENTS

| | | |
|---|---|---|
| 2,878,135 A | 3/1959 | Willis |
| 3,042,259 A | 7/1962 | Eugel |

(Continued)

FOREIGN PATENT DOCUMENTS

| | | | | |
|---|---|---|---|---|
| BE | 898466 A | * | 6/1984 | ......... C08G 18/4288 |
| CN | 1200136 A | | 11/1998 | |

(Continued)

OTHER PUBLICATIONS

US 5,841,144 A, 11/1998, Cresswell (withdrawn)
(Continued)

*Primary Examiner* — Shuangyi Abu Ali
(74) *Attorney, Agent, or Firm* — Mueting Raasch Group

(57) ABSTRACT

A point-of-sale custom color system for tinting base paints and stains includes an array of water-only fluid colorants, including at least white, green, blue and red water-only colorants, which can be used to tint water-borne paints and stains. When tinting solvent-borne base paints or stains, at least one siccative is added to the solvent-borne base paint or stains at the point-of sale and a synergist containing one or more surfactants and optional dispersing agents or optional cosolvents is also added to or is a part of the solvent-borne base paint or stains. Collectively, the siccative and synergist enable effective tinting using the water-only colorants and suitable drying characteristics of the solvent-borne paint or stain.

18 Claims, 5 Drawing Sheets

(51) Int. Cl.
  *C08K 3/22* (2006.01)
  *C08K 9/04* (2006.01)
  *C09D 7/61* (2018.01)
  *C09D 7/63* (2018.01)
  *C09D 153/00* (2006.01)
  *C09D 167/00* (2006.01)

(52) U.S. Cl.
  CPC ............... *C09D 7/61* (2018.01); *C09D 7/63* (2018.01); *C09D 153/00* (2013.01); *C09D 167/00* (2013.01); *C08K 2003/0812* (2013.01); *C08K 2003/0825* (2013.01); *C08K 2003/0843* (2013.01); *C08K 2003/0856* (2013.01); *C08K 2003/0893* (2013.01); *C08K 2003/2241* (2013.01)

(56) References Cited

U.S. PATENT DOCUMENTS

| | | |
|---|---|---|
| 3,074,597 A | 1/1963 | Felts |
| 3,210,209 A | 10/1965 | Jones et al. |
| 3,670,785 A | 6/1972 | Heiss et al. |
| 4,089,699 A | 5/1978 | Blackburn et al. |
| 4,427,835 A | 1/1984 | Bush et al. |
| 4,442,256 A | 4/1984 | Miller |
| 4,468,498 A | 8/1984 | Kowalski et al. |
| 4,469,825 A | 9/1984 | Kowalski et al. |
| 4,594,363 A | 6/1986 | Blakenship et al. |
| 4,716,188 A | 12/1987 | Mariusson |
| 4,880,842 A | 11/1989 | Kowalski et al. |
| 4,887,217 A | 12/1989 | Sherman |
| 4,920,160 A | 4/1990 | Chip et al. |
| 4,946,100 A | 8/1990 | Flemming et al. |
| 4,985,064 A | 1/1991 | Redlich et al. |
| 5,004,828 A | 4/1991 | Mathai |
| 5,036,109 A | 7/1991 | Chip et al. |
| 5,041,464 A | 8/1991 | Hoshino et al. |
| 5,157,084 A | 10/1992 | Lee et al. |
| 5,163,484 A | 11/1992 | Howlett et al. |
| 5,184,783 A | 2/1993 | Hockmeyer et al. |
| 5,297,697 A | 3/1994 | Boring |
| 5,305,917 A | 4/1994 | Miller et al. |
| 5,340,394 A | 8/1994 | Elsamanoudi |
| 5,340,871 A | 8/1994 | Pearson |
| 5,409,776 A | 4/1995 | Someya et al. |
| 5,510,422 A | 4/1996 | Blakenship et al. |
| 5,560,521 A | 10/1996 | Boring et al. |
| 5,622,288 A | 4/1997 | Boring |
| 5,814,144 A | 9/1998 | Coutts et al. |
| 5,897,698 A | 4/1999 | Lee et al. |
| 6,020,407 A | 2/2000 | Campbell et al. |
| 6,221,145 B1 | 4/2001 | McClain |
| 6,277,188 B1 | 8/2001 | Salter |
| 6,287,377 B1 | 9/2001 | Binns et al. |
| 6,448,366 B1 | 9/2002 | Santhanam et al. |
| 6,488,760 B1 | 12/2002 | Binns et al. |
| 6,701,977 B2 | 3/2004 | Taylor et al. |
| 6,969,190 B1 | 11/2005 | McClain et al. |
| 6,991,004 B2 | 1/2006 | Kaufhold et al. |
| 7,250,464 B2 | 7/2007 | Friel et al. |
| 7,659,340 B2 | 2/2010 | Coward et al. |
| 7,659,350 B2 | 2/2010 | Prud et al. |
| 8,110,624 B1 | 2/2012 | Brandenburger et al. |
| 8,141,599 B2 | 3/2012 | Korenkiewicz et al. |
| 8,318,834 B2 | 11/2012 | Hefner, Jr. |
| 8,328,930 B2 | 12/2012 | Tauber et al. |
| 8,357,456 B2 | 1/2013 | Ma |
| 8,528,605 B2 | 9/2013 | Smith |
| 8,746,291 B2 | 6/2014 | Hertz et al. |
| 8,748,550 B2 | 6/2014 | Cavallin et al. |
| 8,752,594 B2 | 6/2014 | Gebhard |
| 8,822,580 B2 | 9/2014 | Korenkiewicz et al. |
| 9,080,030 B2 | 7/2015 | Amiel et al. |
| 9,120,950 B1 | 9/2015 | Hinkley et al. |
| 9,144,778 B2 | 9/2015 | Manicardi |
| 10,577,512 B2 | 3/2020 | Aitha |
| 10,933,389 B2 | 3/2021 | Ellsworth et al. |
| 10,934,151 B2 | 3/2021 | Ellsworth et al. |
| 11,267,688 B2 | 3/2022 | Ellsworth et al. |
| 2005/0039635 A1 | 2/2005 | Yang |
| 2005/0080171 A1 | 4/2005 | Reisacher et al. |
| 2006/0165991 A1 | 7/2006 | Moril |
| 2007/0055001 A1 | 3/2007 | Geursten et al. |
| 2007/0055002 A1 | 3/2007 | Campbell et al. |
| 2007/0084520 A1 | 4/2007 | Driessen |
| 2007/0095421 A1 | 5/2007 | Page |
| 2007/0244246 A1 | 10/2007 | Paczkowski et al. |
| 2007/0266901 A1 | 11/2007 | Rance |
| 2008/0139735 A1 | 6/2008 | Reisacher et al. |
| 2008/0148995 A1 | 6/2008 | Lawlor et al. |
| 2008/0227871 A1 | 9/2008 | Kim et al. |
| 2008/0305241 A1 | 12/2008 | Trevino, III et al. |
| 2009/0099695 A1 | 4/2009 | Trevino, III et al. |
| 2009/0228143 A1 | 9/2009 | Hughes et al. |
| 2011/0290375 A1 | 12/2011 | Hertz |
| 2012/0316273 A1 | 12/2012 | Korenkiewicz |
| 2013/0125790 A1 | 5/2013 | McLachlan et al. |
| 2013/0276672 A1 | 10/2013 | Amiel |
| 2013/0308219 A1 | 11/2013 | Kunimoto |
| 2014/0299605 A1 | 10/2014 | Hertz |
| 2016/0280939 A1 | 9/2016 | Olszanski et al. |
| 2016/0333213 A1 | 11/2016 | Zhou et al. |
| 2017/0051151 A1 | 2/2017 | Thommassen et al. |
| 2017/0088723 A1 | 3/2017 | Sheerin et al. |
| 2018/0010007 A1 | 1/2018 | Roland |
| 2018/0223121 A1 | 8/2018 | Reisacher et al. |
| 2019/0030502 A1 | 1/2019 | Ellsworth |
| 2019/0031489 A1 * | 1/2019 | Ellsworth ............ C09D 175/06 |
| 2022/0010148 A1 | 1/2022 | Donlon et al. |

FOREIGN PATENT DOCUMENTS

| | | |
|---|---|---|
| CN | 102083922 A | 6/2011 |
| CN | 102741361 A | 10/2012 |
| CN | 106661341 A | 5/2017 |
| CN | 107429100 A | 12/2017 |
| CN | 109306214 A | 2/2019 |
| DE | 10204583 A1 | 8/2003 |
| KR | 20160016077 A | 2/2016 |
| WO | WO 1992/007913 A1 | 5/1992 |
| WO | WO 93/09187 A1 | 5/1993 |
| WO | WO 97/08255 A1 | 3/1997 |
| WO | WO 00/22050 A1 | 4/2000 |
| WO | WO 03/066743 A | 8/2003 |
| WO | WO 2006/047238 A2 | 5/2006 |
| WO | WO 2006/105348 A2 | 10/2006 |
| WO | WO 2007/030382 A2 | 3/2007 |
| WO | WO 2007/030626 A2 | 3/2007 |
| WO | WO 2009/106646 A1 | 9/2009 |
| WO | WO 2009/111479 A2 | 9/2009 |
| WO | WO 2010/091418 A1 | 8/2010 |
| WO | WO 2011/084162 A1 | 7/2011 |
| WO | WO 2012/130763 A1 | 10/2012 |
| WO | WO 2015/165994 A2 | 11/2015 |
| WO | WO 2015/188103 A1 | 12/2015 |
| WO | WO 2016/040641 A1 | 3/2016 |
| WO | WO 2016/066173 A1 | 5/2016 |
| WO | WO-2016161387 A1 * | 10/2016 ........... C09B 67/009 |
| WO | WO 2017/029291 A1 | 2/2017 |
| WO | WO 2017/125556 A1 | 7/2017 |
| WO | WO 2018/067829 A1 | 4/2018 |

OTHER PUBLICATIONS

International Search Report and Written Opinion for Application No. PCT/US2021/040685 dated Sep. 21, 2021, 8 pages.
Qunying, Li "Common Technical Manual for Coating Workers," Shanghai Science and Technology Press, Jul. 2008 55-56.
Chinese Office Action for CN 202180048191.7 issued by the Chinese Patent Office on Jun. 28, 2024; 21 pgs. including English translation.
ASTM D281-12, Standard Test Method for Oil Absorption of Pigments by Spatula Rub-Out, 2016.

(56) References Cited

OTHER PUBLICATIONS

ASTM D5326-94a, Standard Test Method for Color Development in Tinted Latex Paints, 2013.
ASTM D1483-12, Standard Test Method for Oil Absorption of Pigments by Gardner-Coleman Method, 2016.
ASTM D2244-16, Standard Practice for Calculation of Color Tolerances and Color differences from Instrumentally Measured Color Coordinates, 2017.
Baggen, Peter "Point-of-sale Tinting: Achieving cost-effective color variety," Paintindia. Dec. 2-12; 3 pgs.
BASF, "Pigments, pigment preparations, dyes and light stabilizers for coatings, plastics, printing inks and specialty industries", 156 pgs. Sep. 2007. Downloaded from : https://www.2.basf.us/additives/pdfs/color_brochure_plastics.pdf.
BASF, "Little Helpers Love Great Achievements-Formulation Additives by BASF," BASF SE Dispersions & Pigments Division. Retrieved on Aug. 28, 2019 from the internet, 2017; 76 pgs.
BASF, "Product Selection Guide, Pigments, pigment preparations, dispersions, resins and additives for the architectural coatings industry", 2013; 68 pgs.
"More Flexibility with Xfast®!," BASF the Chemical Company, 8 pgs. 2008.
Benjamin Moore®, "ECO SPEC® WB Interior Latex Flat Finish 373", Product Sheet, Jul. 2010;2 pgs.
Ellsworth, "Water-Only Colorants narrow the Gap to Solvent-Borne Performance," retrieved from the Internet, 2017.
Fed Test Method Std. 141D, "Paint, Varnish, Lacquer and Related Materials: Methods of Inspection, Sampling, and Testing," Mar. 22, 2001; 61 pgs.
Gonzáles-Gómez et al., "Dry Colour Dispensing," *European Coatings Journal,* Jun. 2005; pp. 24.
Koleske et al., "Additives Guide", *Paint and Coatings Industry,* Apr. 2003, pp. 12-86.
Louis C. et al., "Surfactant Influence on Colorant Acceptance," dated Mar. 21, 2016; 7 pgs. Downloaded at: https://www.coatingsworld.com/issues/2016-03-01/view_features/surfactant-influence-on-colorant-acceptance.
O'Hanlon, George, How to Make Oil Paint, Jun. 10, 2013; 15 pgs. Downloaded from the internet at www.naturalpigments.com/artist-materials/tutorial-how-make-paint.
Solvay Product Sheet—Rhodafac Rs 710. Retrieved on Aug. 28, 2019; from the Internet, URL https://www.solvay.com/en/product.rhodafac-rs-710, 2019.
"The Theory" *Benjamin Moore,* found online at URL http://media.benjaminmoore.com/WebServices/prod/ColorStories/Theory_final.pdf, Dec. 24, 2012.
Van Havern, J., "Resins and additives for powder coatings and alkyd paints, based on renewable resources," *Coat Technol Res,* 2007;4(2)177-186.
"Resins for Coatings Applications" Product page [online]. Solvent-based resins for coatings product guide; Synthomer, Mar. 12, 2021, 5 pages.
Worleekyd SD 7003 Technical Leaflet; Jun. 23, 2022: 2 pgs.

* cited by examiner

PAINT TINTING ADJUVANT WITH SICCATIVE FOR LIQUID COLORANT SYSTEM

FIELD

This invention relates to point-of-sale customized-color architectural paint and stain tinting systems, such as those used in retail paint stores to make custom-tinted house paints or stains.

BACKGROUND

Architectural paint and stain manufacturers typically distribute premixed paints and stains in a small number of popular colors. To accommodate consumer desires and enable matching of existing painted or stained surfaces, manufacturers typically also distribute a set of tintable base paints or stains and several liquid colorants. These are combined at point-of-sale outlets using volumetric colorant dispensing equipment and shaker mixing equipment to make small batch lots of custom-tinted paint or stain in a much larger array of colors than the limited color array available in premixed products.

Owing in part to industry custom and the available colorant dispensing equipment, the custom color systems from different paint or stain manufacturers tend to have somewhat similar components. For example, a typical custom color paint system may employ several (e.g., 2 to 4) tintable base paints ranging for example from a bright white base that already contains a white pigment such as titanium dioxide and is intended to accept a relatively small quantity of added colorant at the point-of-sale, to a relatively unpigmented clear base that is intended to accept a much larger quantity of added colorant at the point-of-sale. Base paints and stains may employ various binders (e.g., natural or synthetic resins), binder forms (e.g., solution polymers or latex polymers) and vehicles (e.g., solvent-borne or water-borne versions), and may provide various dried surface finishes (e.g., matte, semi-gloss or gloss finishes). Some manufacturers also sell colored base paints (e.g. a red, a blue and yellow colored base) which are intended to be combined with additional colorant(s) at the point-of-sale when strongly-tinted custom paint shades with one coat hiding power are desired. The colorants in custom color paint or stain systems may for example be volumetrically metered from a multiple-colorant dispensing station, with 12 to 20 paint or stain colorants typically being employed in colorant dispensing stations for the U.S. market, and more (e.g., 16 or 24 colorants) sometimes being employed in other markets.

Years ago, paints and stains were virtually all solvent-borne. Although solvent-borne paints and stains continue to be used, nowadays 80% or more of architectural paints and a significant proportion of stains are water-borne. The overall percentage of water-borne paints and stains as a proportion of total sales is expected to continue to increase. Despite that, some workers or customers continue to prefer solvent-borne paints (for example, alkyd paints) or solvent-borne stains in some end-use applications, and may do so well into the future.

Universal colorants have been developed for use in point-of-sale tinting equipment. Universal colorants typically are formulated by modifying a water-borne colorant formulation to include appropriate surfactants, and optionally to include appropriate dispersing agents or cosolvents, so that the colorant can tint either a water-borne or solvent-borne base paint or stain using the same tinting machine.

SUMMARY OF THE INVENTION

Unfortunately, the use of universal colorants requires compromises in paint performance in order effectively to bridge the colorant compatibility gap between water-borne and solvent-borne systems. For example, in water-borne paints tinted with universal colorants, the compromised performance factors may include one or more of higher volatile organic compound (VOC) content, surfactant leaching, increased tack, reduced hardness, reduced blocking resistance and viscosity drop. For solvent-borne paints tinted with such universal colorants, the compromised performance factors may include one or more of longer drying times, reduced film hardness or altered gloss. Some point-of-sale paint stores use water-borne colorants to tint water-borne paints and stains, and employ a separate tinting machine containing solvent-borne colorants optimized for use with solvent-borne paints and stains. However, this solution is not ideal because it requires investment in and maintenance of two separate tinting machines; requires the sale, storage and inventory of extra Stock Keeping Units (SKUs) representing the solvent-borne paint colorants; and may result in colorant shelf life expiration or dispenser plugging problems for less frequently used water-borne or solvent-borne colorants.

It would be desirable to provide a point-of-sale universal tinting system that could be used with either water-borne or solvent-borne paints and stains, without unduly compromising the performance of the resulting custom-tinted paint or stain product, and without requiring separate tinting machines and separate colorant arrays. The present disclosure provides a paint tinting system utilizing water-borne and solvent-borne paint or stain bases, an array of water-only fluid colorants, a synergist comprising ingredients that will assist in adequately dispersing the water-only colorants into solvent-borne paints or stains, that can help reduce or eliminate the above-mentioned performance compromises, and avoid the need to purchase and maintain separate tinting machines and separate colorant arrays, and one or more siccatives that can be housed separate from or mixed with the synergist that can help improve the drying properties of the solvent-borne paint or stain. In some examples, the disclosed synergist and siccatives may help reduce the cost and presence of superfluous components (e.g., components that have no intended purpose within a given water-borne or solvent-borne paint or stain base) associated with the added colorant, allow for the production of a more storage stable base paint or stain, or both.

The disclosed siccatives help improve certain performance properties in the tinted solvent-borne paints or stains including, namely reducing the tack and drying times of the resultant paint or stain. Traditionally siccatives were added to solvent-borne paint or stain bases such as at the factory during production to help improve drying of base product. However, including such siccatives during the early stages of production have been found to diminish the shelf-life of the product leading to premature curing and skinning of the base material during storage. While some commercially available solvent-borne paint or stain bases may include a drying agent to assist with curing, such agents may be incompatible or insufficient to correct or counteract the increased dry times observed with the synergist is added to such base paints or stains. Adding or increasing the amount of drying agent or siccative at the point of manufacture may lead to insufficient shelf life of the base material. We have found that adding the siccative at the point-of-sale (e.g., pre-mixed with the synergist or added separately) can improve the tack and drying times for the tinted solvent-borne paint or stain bases when used in conjunction with the disclose synergist without diminishing the visual or performance characteristics of the tinted product. Additionally, or alternatively, adding such siccatives at the point-of-sale can allow for the amount of such materials to be reduced or excluded from the solvent-borne paint or stain base during factory production which can improve the shelf-life stability of the solvent-borne paint or stain base prior to consumer purchase.

The disclosed siccative is added to the point-of-sale to the solvent-borne paint or stain base. The siccative may be pre-mixed with the synergist as a single mixture that includes, primarily or exclusively, one or more siccatives and one or more ingredients that will disperse the water-only colorants into solvent-borne base paints or stains or may be added to the solvent-borne base paint or stain separately from the synergist. Additionally, while the below description generally describes that the siccative as being added at the same time synergist (e.g., added together as a pre-mixed mixture), in some examples the synergist may be added to the solvent-borne base paint or stain at some point prior to the point-of-sale. It will be understood that the disclosed siccative can also be housed separately from the synergist such as in a separate container of the disclosed system or pre-mixed with the synergist and collectively housed in a single container.

The disclosed synergist may be a liquid, powdered solid, or a dispersible solid object such as a compressed pill or tablet. The synergist may be introduced into a solvent-borne base paint or stain in a variety of ways, and may be introduced before, together with, or (less preferably) after introduction of one or more water-only fluid colorants into such solvent-borne base paint or stain. In one embodiment, the synergist may be supplied in a cartridge, canister or other standard container of the type normally used for liquid colorants, disposed in one of the tinting machine dispenser slots normally reserved for a colorant, and dispensed into the base paint or stain using the tinting machine metering circuit. In another embodiment, the synergist may be dispensed into a solvent-borne base paint or stain using a separate, "bolt-on" dispensing system. Such a bolt-on system optionally may have lower precision than the tinting machine colorant metering circuit, as the amount of synergist to be employed does not need to be controlled as precisely as the colorant amount. In yet another embodiment, an in-store technician may separately add the synergist at the point-of-sale to a solvent-borne paint or stain (for example as a pill, tablet, sachet or other dispersible or dissolvable pouch, or as a pour-in powdered product). In a further embodiment, a paint or stain manufacturer may add or include the synergist to or in a base paint or stain at a factory, warehouse or other non-retail site prior to delivery to a point-of-sale retail, wholesale or combined retail/wholesale outlet. The system can accordingly be used with just the water-only colorants when it is desired to tint a water-borne paint or stain, and can be used with such colorants together with an appropriate amount of the synergist when it is desired to tint a solvent-borne paint or stain.

Because the synergist only needs to be used for tinting solvent-borne paints or stains, the ingredients (e.g., surfactants, siccatives, optional dispersing agents and optional cosolvents) in the synergist may be chosen to optimize the performance of the tinted solvent-borne paint or stain alone, and without regard to their potential impact on water-borne paint or stain performance. This allows for several of the noted compromised performance factors associated water-borne paints being tinted with universal colorants to be effectively avoided as the disclosed base colorant is designed as a water-only colorant.

The invention thus provides, in one aspect, a point-of-sale custom color system for tinting base paints and stains, the system comprising:
 a) an array of water-only fluid colorants including at least white, green, blue and red colorants comprising one or more pigments or dyes and a surface treatment, the colorants being packaged in containers with a volume of about 0.5 to about 5 L and from which colorant is gravimetrically or volumetrically dispensed via an automated or manual colorant dispenser into the base paint or stain with a volume of about 0.2 to 20 L;
 b) at least one siccative; and
 c) at least one synergist containing, primarily or exclusively, one or more ingredients that will disperse the water-only colorants into solvent-borne base paints or stains.

In an embodiment, the above point-of-sale custom color system may house the siccative separate form the synergist (e.g., in a separate container) to be added into the solvent-borne base paints or stains before, at the same time, or after addition of the synergist to the solvent-borne paint or stain base.

In another embodiment, the above point-of-sale custom color system the siccative is mixed together with the synergist. In such examples, the synergist may be characterized as containing, primarily or exclusively, a mixture of the at least one siccative and the one or more ingredients that will disperse the water-only colorants into the solvent-borne base paints or stains, with the ingredients used to disperse the water-only colorants forming the primary component of the synergist.

In an embodiment, the above point-of-sale custom color system also includes at least one water-borne base paint or stain and at least one solvent-borne base paint or stain, the base paints or stains being packaged in largely but incompletely filled point-of-sale containers equipped with an openable and recloseable lid, cap or other closure for an opening through which colorant may be dispensed from the automated or manual colorant dispenser into the base paint or stain. In some such embodiments, the solvent-borne base paint or stain may be substantially siccative-free.

In a further embodiment, the above point-of-sale custom color system also includes the automated or manual colorant dispenser.

The invention thus provides, in another aspect, a point-of-sale custom color system for tinting base paints and stains, the system comprising:
 a) an array of water-only fluid colorants including at least white, green, blue and red colorants comprising one or more pigments or dyes and a surface treatment, the colorants being packaged in containers with a volume of about 0.5 to about 5 L and from which colorant is gravimetrically or volumetrically dispensed via an automated or manual colorant dispenser into the base paint or stain with a volume of about 0.2 to 20 L; and
 b) at least one siccative; and
 c) a solvent-borne base paint or stain comprising at least one synergist containing, primarily or exclusively, one or more ingredients that will disperse the water-only colorants into solvent-borne base paints or stains.

The invention provides, in another aspect, a method for point-of-sale custom paint or stain tinting, the method comprising using an automated or manual colorant dispenser to dispense into water-borne and solvent-borne base paints or stains at a retail, wholesale or combined retail/wholesale outlet one or more water-only fluid colorants selected from an array of colorants including at least white, black, red, green and blue water-only colorants comprising one or more pigments or dyes and a surface treatment, and further comprising adding at least one siccative at the point-of-sale to the solvent-borne base paint or stain and adding to or including in such paints or stains at least one synergist comprising one or more ingredients that will disperse the water-only colorants into such solvent-borne base paints or stains.

The invention provides, in another aspect, a container housing a mixture for use in a point-of-sale custom color system for tinting base paints and stains, the mixture comprising, primarily or exclusively, one or more siccatives and one or more synergists, the one or more synergists comprising, primarily or exclusively, one or more ingredients that will disperse the water-only colorants into solvent-borne base paints or stains.

The disclosed system and method permit point-of-sale formulation and sale of both water-borne and solvent-borne custom-tinted paints and stains using a single tinting machine and a single colorant array, while avoiding or minimizing added inventory, dedicated dispensers or dedicated floor space. Additionally, adding the siccative to the solvent-borne paint or stain at the point-of-sale can reduce the drying and tack times of the custom-tinted paint and stain while also allowing the base solvent-borne paint or stain to be formulated for improved shelf-life. In a further embodiment, prior to the introduction of the disclosed synergist, the above disclosed solvent-borne base paint or stain may be substantially free of a drying agent at the time of manufacture.

This application is related to copending application Ser. No. 16/923,284, filed Jul. 8, 2020 and entitled "PAINT TINTING ADJUVANT WITH SICCATIVE FOR POWDER COLORANT SYSTEM", the disclosure of which is incorporated herein by reference.

BRIEF DESCRIPTION OF THE DRAWING

Like reference symbols in the various figures of the drawing indicate like elements. The elements in the drawing are not to scale.

DETAILED DESCRIPTION

Figure 1:
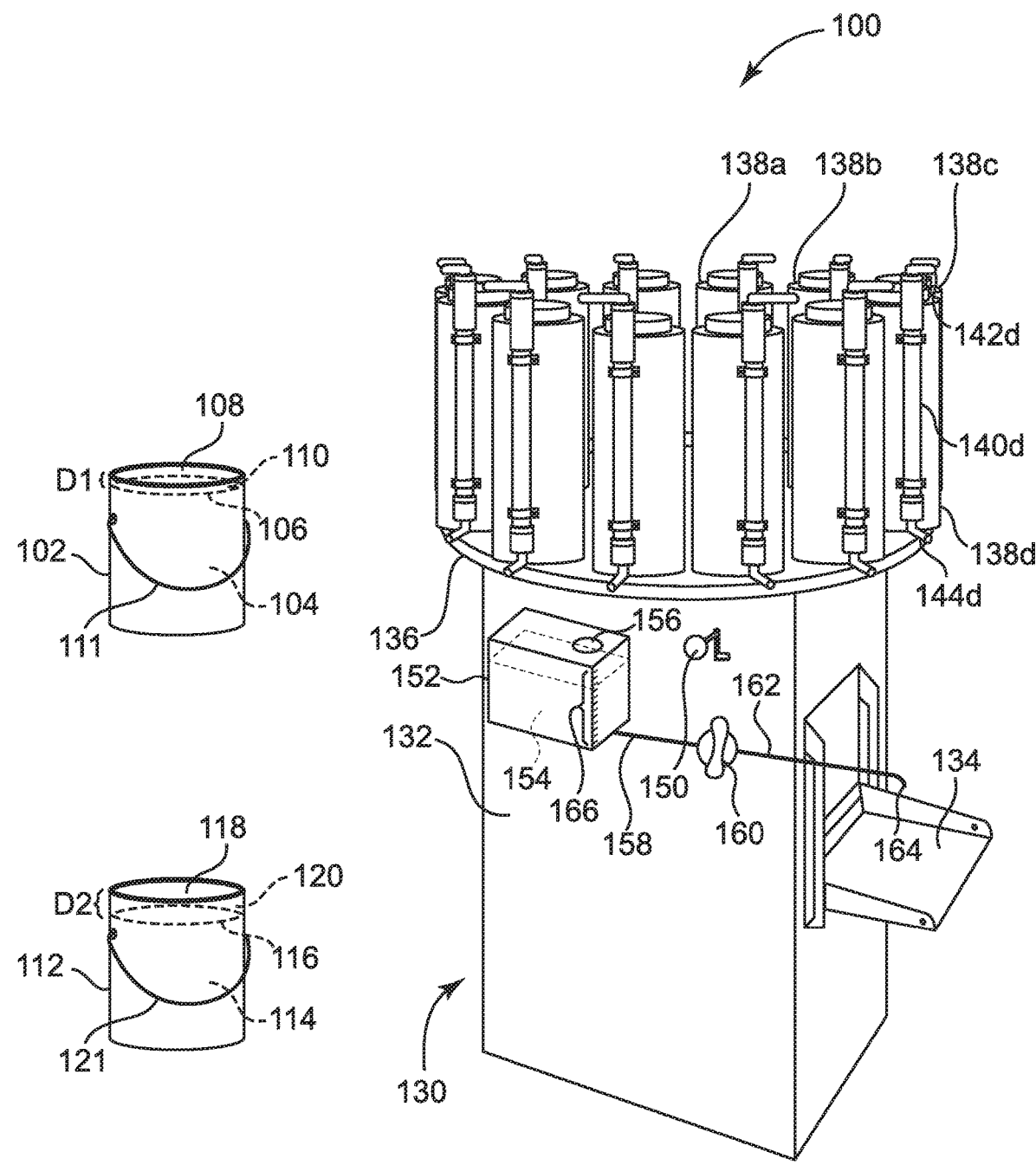
FIG. 1 and FIG. 2 are perspective views of embodiments of the disclosed paint or stain tinting system.

Unless the context indicates otherwise the following terms shall have the following meaning and shall be applicable to the singular and plural:

The terms "a," "an," "the," "at least one," and "one or more" are used interchangeably. Thus, for example, a system or method that includes "a" synergist means that the system or method may include "one or more" synergists.

The terms "architectural paints" and "architectural stains" respectively mean paints and stains for use on interior or exterior building or construction surfaces, e.g., walls, trim, floors, decks, railings, ceilings, roofs (including metal roofing, shingles and tiles), roadways, sidewalks, etc.

The term "array" when used with respect to colorants means an assortment of colorants intended to be used individually or in appropriate combinations to tint base paints or stains so as to provide user-customized colors in a wide gamut of hues. A typical array will normally contain at least white, green, blue and red colorants, and usually will also contain one or more black colorants, one or more yellow colorants and one or more oxide colorants such as red oxide or yellow oxide. The individual colorants in a typical array will normally be supplied by a single manufacturer, be packaged in similar containers, bear similar labels each having a distinct SKU identifier, and may bear a unifying trademark for the array or for the brand of paint or stain with which the array is intended to be used.

The term "automated colorant dispenser" means a dispenser for paint or stain colorants which is controlled or controllable via electronically-regulated precision gravimetric weighing or volumetric metering devices so as to dispense controlled quantities of one or more colorants (e.g., water-only colorants) into a base paint or stain container and thereby facilitate preparation of tinted paints or stains whose tints are selected from an array of tints. The colorant types and amounts selected by such an automated colorant dispenser will optionally and preferably be controlled using software and a suitable database.

The term "base paint or stain" means a water-borne or solvent-borne paint or stain product packaged in a largely but incompletely filled point-of-sale container with a volume of about 0.2 to 20 L equipped with an openable and recloseable lid, cap or other closure, and which may be used as is but normally will be tinted at the point-of-sale by adding one or more colorants to the paint or stain product in its container, and stirring, shaking or otherwise mixing the container contents to disperse the colorant throughout the base paint or stain product.

The term "binder" means a film-forming natural or synthetic polymer suitable for use in a paint or stain.

The term "colorant" means a composition that can be added to (e.g., dispensed into) a point-of sale container whose interior volume is largely (e.g., two thirds of the container volume or more) but not completely already filled with a base paint or stain so as to alter the hue or lightness of such base paint or stain, and which contains pigment or dye, a surface treatment (e.g., a surfactant or dissolution aid) and an optional vehicle but is substantially free of binder.

The term "custom-tinted" when used with respect to a system or method for tinting base paints or stains means that one or more colorants can be dispensed into a base paint or stain and mixed to provide finished paint or stains in a wide variety of (e.g., more than one hundred or even more than one thousand) preselected formulated colors or, if desired, a match for randomly-selected colors. The preselected formulated colors will ordinarily be viewed by potential end users using printed color charts or displayed computer images.

The term "headspace" when used with respect to a base paint or stain in an openable container refers to an unfilled small portion of the total container volume (for example, about 1% to about 33%, and in some embodiments about 1% to about 15%, of the total container volume) available for and intended to be used for colorant addition.

The term "liquid" when used to describe a material that can exist in several different phases refers to the phase occupied by that material at room temperature (23° C.) and 1 atm.

The term "manual colorant dispenser" means a non-automated dispenser for paint or stain colorants which is equipped with manually-movable pistons whose strokes have been indexed to manually meter quantities of one or more colorants into a base paint or stain container and thereby facilitate preparation of tinted paints or stains whose tints are selected from an array of tints.

The term "NVM" is an abbreviation for non-volatile materials, and refers to a material that does not significantly evaporate at standard temperature and pressure. NVM content may be evaluated using ASTM D1353-13.

The term "paint" means a coating composition including pigment and binder which when applied to form a thin (e.g., 100 μm) wet thickness coating film on a freshly-sanded smooth wood surface, will when dried hide or substantially hide the wood grain and will present a new surface with its own appearance.

The term "pigment" includes both colored, dispersible solid particulate materials and colored dispersible or soluble dye materials, wherein the material imparts visually noticeable color to a base paint or stain when 5 wt. % (in the case of a colored, dispersible solid particulate) or 0.05 wt. % (in the case of a colored, dispersible or soluble dye) of the material is added to (e.g., dispensed into) the base paint or stain. The presence or absence of visually noticeable color may be assessed by preparing drawdown samples of the base paint or stain with and without the pigment, casting such samples as 25 μm dry thickness coated films over the white part of a BYK-Gardner No. PA-2811 opacity drawdown chart (from BYK-Gardner USA) or comparable chart, and examining the coated films under normal overhead interior illumination.

The term "pigment volume concentration" when used in respect to a paint, stain or colorant means the total percentage of dried coating volume occupied by all pigment species in the coating.

The terms "point-of-sale" and "retail" when used with respect to a site, location, store or other outlet means a place at which custom-mixed paints or stains are tinted and mixed in small batch lots (e.g., one half pint, one pint, one quart, one liter, one gallon, four liter, five gallon or 20 liter containers, corresponding to containers from about 0.2 to 20 L) for sale to end-users (e.g., painters, builders and homeowners). Representative point-of-sale retail, wholesale or combined retail/wholesale outlets include paint stores, hardware stores, building supply stores (including warehouses), and distribution centers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "primarily or exclusively", when used with respect to the amount of ingredients in a synergist, means in the case of the word "primarily" that the named ingredient or ingredients represent at least 50 wt. % of the ingredients in such synergist, excluding any solvent or other carrier (e.g., water) that may be present in the synergist. In some embodiments the named ingredient or ingredients may represent at least 60 wt. %, at least 70 wt. %, at least 80 wt. % or at least 90 wt. % of the ingredients in such synergist, excluding such solvent or other carrier. In the case of the word "exclusively", the synergist consists essentially of or consists of such named ingredients, excluding such solvent or other carrier.

The term "siccative" means an additive dispersible within an air-oxidizable solvent-borne base paint or stain that accelerates the curing time of alkyd materials contained within the base paint or stain. Without being bound by theory, such siccatives are believed to accelerate such curing time by catalyzing the free-radical autoxidation of conjugated double bonds contained therein when exposed to air.

The term "siccative-free" when used in the context of a siccative-free synergist or base paint or stain means a representative component formulated without including a siccative. In some embodiments, a siccative-free composition may be the same as a composition that is substantially free of siccative materials.

The term "solid" when used to describe a material that can exist in several different phases refers to the phase occupied by that material at room temperature (23° C.) and 1 atm.

The term "solvent-borne" when used in respect to a paint, stain or colorant means that the major liquid vehicle or carrier for the paint, stain or colorant is a nonaqueous solvent or mixture of nonaqueous solvents.

The term "stain" means a coating composition including binder which when applied to form a thin (e.g., 100 μm) wet thickness coating film on a freshly-sanded smooth wood surface, will when dried not hide both the wood grain and its texture. When a semi-transparent stain is applied to wood, the wood grain and its texture normally both remain noticeable, whereas when a solid color (viz., opaque) stain is applied the grain normally becomes hidden while the texture normally remains noticeable. A stain typically will soak into a wood or other porous substrate (e.g., concrete) to a much greater extent than will a paint.

The term "substantially free of" when used with respect to an ingredient or composition means that the referenced ingredient or composition contains less than 0.1 wt. % of the recited component. The term "completely free" of a particular compound means that the recited material or composition contains less than 100 parts per million (ppm) of the compound.

The terms "tint strength" and "tinting strength" refer to the value obtained using spectrophotometric instrumentation such as, but not limited to, a Datacolor DC500, DC800 or similar spectrophotometer, a D65 illuminant, CIE 1964 10° Standard Observer angle and reflectance mode.

The term "uncolored" when used with respect to a synergist means that the synergist does not contain visually noticeable quantities of pigment. A synergist may however have its own inherent color, such as the yellow coloration sometimes found in amine group-containing surfactants or provided by certain siccatives.

The term "water-borne" when used in respect to a paint, stain or colorant means that the major liquid vehicle or carrier for the paint, stain or colorant is water.

The term "water-only" when used with respect to a fluid (viz., liquid) colorant means that the colorant can be used to tint a water-borne base paint or stain, but exhibits objectionable rub-up (viz., unsatisfactory compatibility) when added by itself in an attempt to tint a conventional solvent-borne paint (such as Ace™ Royal™ polyurethane alkyd enamel from Ace Hardware Co., Item No. 245A320) or a conventional solvent-borne stain (such as Cabot™ Semi- Transparent deck and siding stain No. 0306 from The Valspar Corporation). Rub-up may be evaluated using the Rub-Up Test shown below in the Examples section. Objectionable rub-up corresponds to more than a moderate dark rating in the Rub-Up Test. A skilled paint tinting technician would regard a water-only colorant as being a "non-universal" colorant, and would regard a universal colorant as not being a water-only colorant.

The recitation of a numerical range using endpoints includes all numbers subsumed within that range (e.g., 1 to 5 includes 1, 1.5, 2, 2.75, 3, 3.80, 4, 5, etc.).

FIG. 1 shows a perspective view of an embodiment 100 of the disclosed paint and stain mixing system. Container 102 holds a liquid water-borne base paint or stain 104. The upper surface 106 (shown in phantom view) of base paint or stain 104 is located a sufficient distance D1 below container lid 108 so that a headspace 110 is available for the addition of one or more colorants to prepare a custom-tinted water-borne paint or stain with a custom hue. Handle 111 may be used to carry container 102. Container 112 holds a liquid solvent-borne base paint or stain 114. The upper surface 116 (also shown in phantom view) of base paint or stain 114 is located a sufficient distance D2 below container lid 118 so that a headspace 120 is available for the addition of one or more colorants to prepare a solvent-borne paint or stain with a custom hue. Distance D2 may be greater than, less than or the same as distance D1, and will depend on the amount of colorants already present in base paints or stains 104 and 114 and the expected amount of colorant(s) that might need to be dispensed into base paints or stains 104 and 114 to obtain satisfactory final hues. Handle 121 may be used to carry container 112. The disclosed system and method may optionally employ a further base or bases (not shown in FIG. 1), for example a clear water-borne or solvent-borne base paint or stain for making deep colored custom tints.

Base paint or stain containers 102 and 112 may be combined with colorant, while container 112 also receives at least one siccative and a synergist that are added to solvent-borne base paint or stain 114. The materials may be added using, for example, the manual colorant dispenser 130. Dispenser 130 includes cabinet 132 on which is mounted shelf 134 where containers 102 or 112 may be placed for colorant addition, siccative addition, synergist addition, or combinations thereof. Turntable 136 includes a series of refillable colorant, siccative, or synergist dispenser canisters (twelve in this case, four of which are numbered as 138a, 138b, 138c and 138d) containing a point-of-sale array of liquid colorants in most of the canisters and siccative and synergist either combined together (e.g., a pre-mixed mixture) or stored separately in one or more of the remaining canisters. For example, the synergist and siccative may be pre-mixed together and contained in canister 138a, and colorants may be contained in canisters 138b, 138c and 138d and the other unnumbered canisters on turntable 136. Alternatively, for example if it is desired to use all available turntable positions for colorant addition, the siccative, synergist, or both may be dispensed into solvent-borne base paint or stain 114 using one or more separate bolt-on dispensers or a combination of a bolt-on dispenser and canister 138a. An exemplary such dispenser is represented by reservoir 152 which contains a synergist containing a siccative 154 (shown in phantom view) and which is closed by removable cap 156. Reservoir 152 may be refilled by removing cap 156 and pouring additional synergist and siccative into reservoir 152. Outlet conduit 158, manually-operated valve 160 and dispensing spout 162 may be used to dispense synergist and siccative into container 112 from spout 164. The amount of synergist and siccative added to container 112 may be estimated using index marks 166 or by noting the change in the content level within container 112 during addition. The mixture volume of synergist and siccative may also be metered by valve 160, for example by providing a hollow chamber in valve 160 holding a specified amount (for example, 0.5 fluid ounce or 14.8 mL) and configuring valve 160 so that the entire contents of the chamber are dispensed from spout 164 when the handle on valve 160 is rotated one full turn. Additional turns can be used to dispense additional mixture. A typical synergist and siccative addition to a 1 gallon (3.78 L) base paint or stain container will be about 1 to about 5 fluid ounces (about 59 mL) and need not be as precisely measured as when adding colorants. Thus for a valve 160 configured as described above, a single turn of the valve handle might be used to dispense sufficient mixture into a 1 quart (0.946 L) container holding a solvent-borne paint or stain, and four full turns might be used to dispense sufficient synergist and siccative into a 1 gallon (3.78 L) container holding such paint or stain. In some embodiments, the tinted paint or stain may include about 0.01 to about 0.25 fl oz/gal siccative and about 1 to about 4 fl oz/gal synergist.

When tinting a water-borne base paint or stain such as base paint or stain 104, the synergist and siccative preferably are not employed. When tinting a solvent-borne base paint or stain such as base paint or stain 114, the synergist and siccative are usually or always employed together with one or more colorants, and is omitted only when the volume or type of colorant is such that compatibility problems will not be expected to arise. By way of example, canister 138d includes a metered dispensing cylinder 140d containing a piston and connecting link (neither of which is shown in FIG. 1) joined to movable handle 142d whose position can be adjusted vertically along cylinder 140d to provide for the metered delivery of colorant, siccative, or synergist from canister 138d through dispensing outlet 144d and into a container such as base paint or stain container 102 or 112 placed on shelf 134. The remaining canisters include similar but unnumbered metered dispensing cylinders, pistons, connecting links, handles and dispensing outlets. Release lever 150 permits turntable 136 to be rotated as needed to bring each colorant, siccative, or synergist canister in line above shelf 134 and locked into place while colorant, siccative, or synergist is metered and dispensed into a base paint or stain container. The amount and type of synergist and siccative that will be dispensed into a solvent-borne base paint or stain may in the interest of simplicity be the same whenever a solvent-borne base paint or stain is tinted. In other embodiments, the amount or type of synergist(s) or siccative(s) may be varied depending on the amount of colorant to be added (viz., a particular siccative may be employed when a dark or deep tint is prepared and another siccative may be employed when a light pastel tint is prepared), the type of colorant to be added (viz., more synergist or another synergist may be employed when a green or blue tint is prepared, and less or no synergist may be employed when a black or yellow tint is prepared), or both the amount and type of colorant to be added. The amount or type of synergist(s) and siccative(s) may also be varied depending upon the chosen solvent-borne base paint or stain. Preferably the synergist(s) and siccative(s) are added prior to the addition of colorants, but this is not required.

Figure 2:
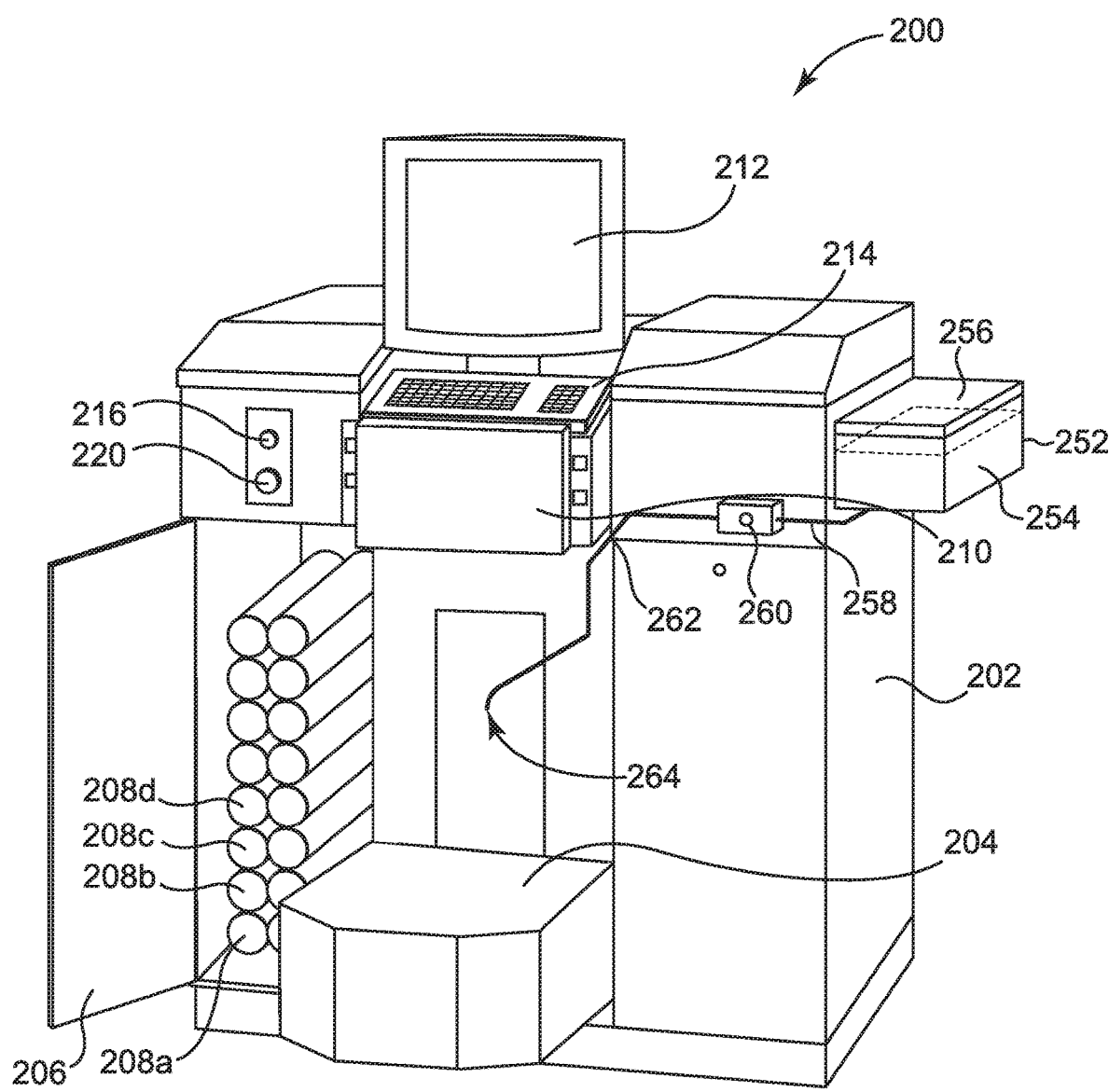
Figure 2:
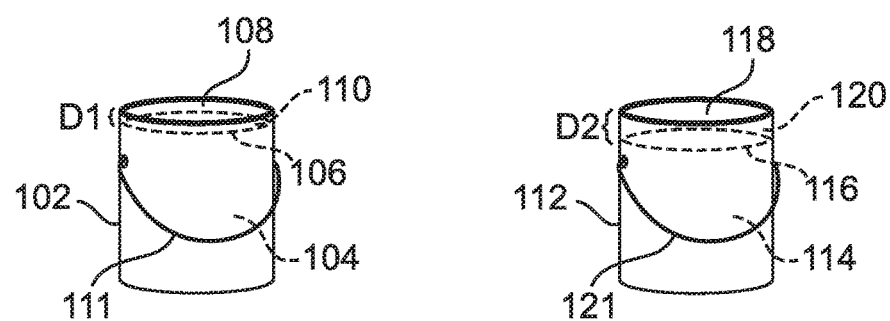

FIG. 2 shows a perspective view of an embodiment 200 of the disclosed paint and stain mixing system. Base paint or stain containers 102 and 112 are as in FIG. 1. Containers 102 and 112 may be combined with colorant, and synergist containing siccative may be added to container 112, using automated colorant dispenser 202. Dispenser 202 includes a shelf 204 where containers 102 or 112 may be placed for colorant or synergist and siccative addition. Cabinet 206 holds a series of replaceable dispenser canisters (sixteen in this case, four of which are numbered as 208a, 208b, 208c and 208d) containing a point-of-sale array of liquid colorants in most of the canisters and may contain one or more synergists, one or more siccatives, or one or more mixtures of the siccative(s) and synergist(s) in one or more remaining canisters. Colorant, siccative, and synergist is dispensed from the appropriate canister through suitable internal plumbing in cabinet 206 (not shown in FIG. 2) and suitable dispensing nozzles (not shown in FIG. 2) positioned in dispensing head 210, and thence into a base paint or stain container. Alternatively, the synergist and siccative may be dispensed into solvent-borne base paint or stain 114 from a separate bolt-on dispenser. An exemplary such separate dispenser is represented by reservoir 252 which contains synergist and siccative 254 (shown in phantom view) and includes removable cover 256 to permit refilling of reservoir 252. Outlet conduit 258, electrically-operated metering valve 260 and dispensing spout 262 may be used to dispense synergist and siccative into container 122 from spout outlet 264. A microprocessor or other control device (not shown in FIG. 2) may be used to meter the amount of synergist and siccative added to container 112. A monitor 212 and keyboard 214 permit information and commands to be entered into dispenser 202. A barcode reader (not shown in FIG. 2) may be used to read information from paint or stain sample cards or base paint or stain containers to assist in controlling the system. A power button 216 and emergency off button 220 may be used to start and stop dispenser 202 and valve 260. As is the case for the embodiments shown in FIG. 1, the amount or type of synergist(s) and siccative(s) may be varied depending on the amount or type of colorant to be added. In addition, and as is the case for the embodiments shown in FIG. 1, the amount or type of synergist(s) and siccative(s) may also be varied depending upon the chosen solvent-borne base paint or stain. Such variations in the amount or type of synergist(s) and siccative(s) will generally be much more easily and reliably accomplished in an automated colorant dispenser like that shown in FIG. 2 then in a manual colorant dispenser like that shown in FIG. 1.

Figure 3:
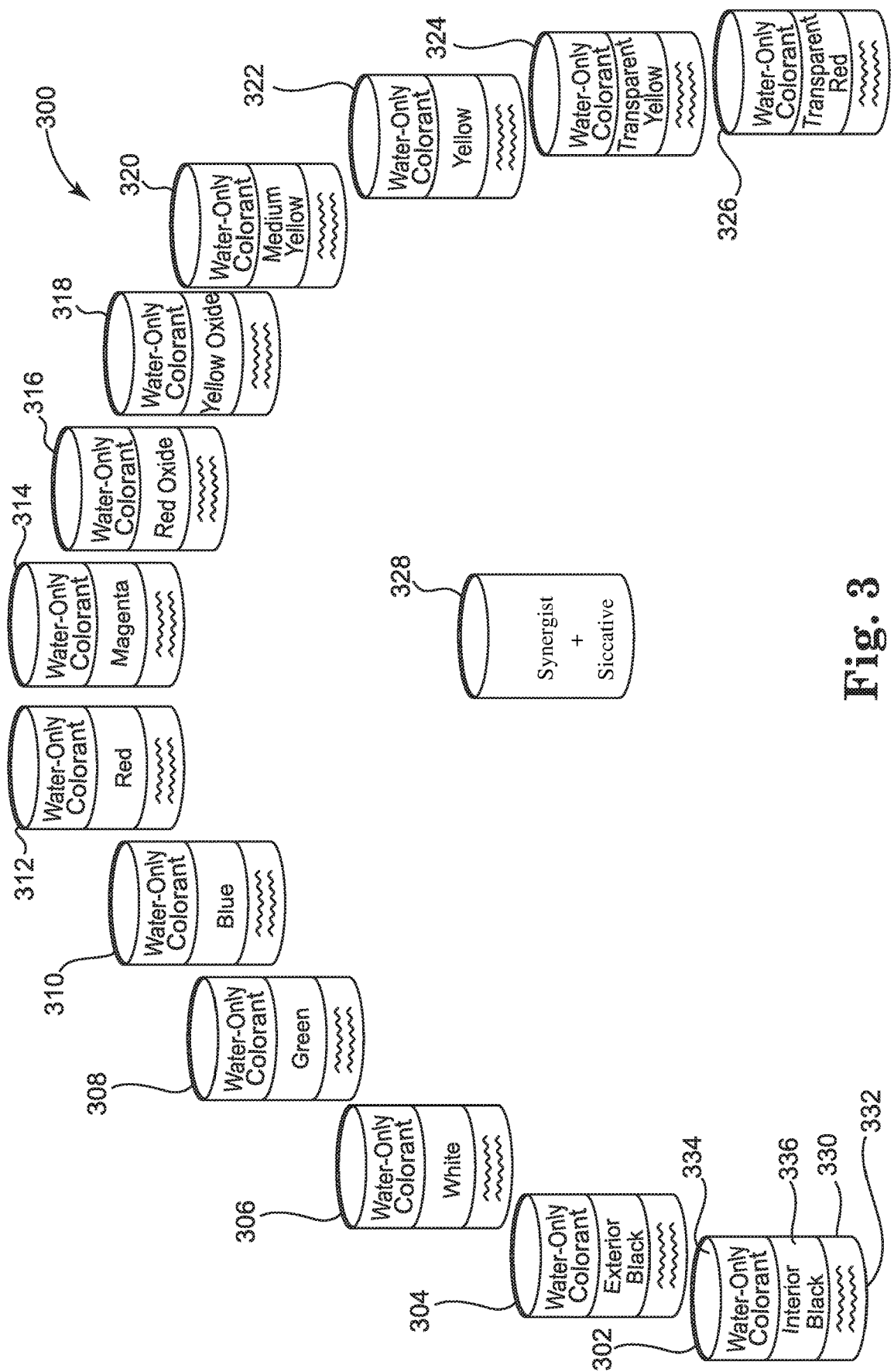
FIG. 3 is a schematic view of an embodiment of the disclosed colorant array and the disclosed synergist.

FIG. 3 is a perspective view of a point-of-sale colorant array 300 with thirteen containers 302 through 326 containing water-only fluid colorants in different hues. In the center of FIG. 3 is a fourteenth container designated 328 and containing a synergist and siccative. Alternatively, siccative may be contained in one of canisters 302 through 326 and synergist contained in container 328 or vice versa. Although not shown in FIG. 3, the corresponding point-of-sale custom color system will also include one or more water-borne paint or stain bases like base 102 in FIG. 1 and FIG. 2, and one or more solvent-borne paint or stain bases like base 112 in FIG. 1 and FIG. 2. Container 302 is representative of the other containers in FIG. 3, includes side 330, bottom 332, top 334 and label 336, and may for example contain a water-only liquid colorant such as a carbon black dispersion for use in tinting interior paints. Top 334 preferably is puncturable, shearable or otherwise penetrable, and may resemble the top used in soup cans. Container 304 contains a different water-only liquid colorant such as a dispersion of a non-infrared-absorptive black colorant for use in tinting exterior paints. Containers 306 through 326 preferably contain additional water-only fluid colorants, which in the embodiment shown in FIG. 3 respectively are white, green, blue, red, magenta, red oxide, yellow oxide, medium yellow, yellow, transparent yellow and transparent red colorants. The colorants in containers 302 through 322 preferably are water-only fluid colorants optimized for use with water-borne paints and stains, and the colorants in containers 324 and 326 preferably are water-only fluid colorants optimized for use with water-borne stains. When added by themselves to a solvent-borne paint or stain, the colorants in containers 302 through 326 may exhibit poor compatibility. However, poor compatibility may not be exhibited by all such colorants. For example, the medium yellow colorant in container 320 and the yellow colorant in container 322 may, owing to the nature of these colorants, exhibit reasonable compatibility with both water-borne and solvent-borne paints and stains even in the absence of the synergist in container 328. These latter colorants will nonetheless, in the interest of simplicity, be referred to as "water-only" colorants.

The synergist and siccative in container 328 preferably are optimized to provide improved compatibility (for example, a more homogeneous mixture and appearance, and reduced rub-up) and reduced drying times when at least colorants 306 through 312, and more preferably when each of colorants 302 through 318 and 324 through 326, is dispensed into a solvent-based paint or stain.

Figure 4:
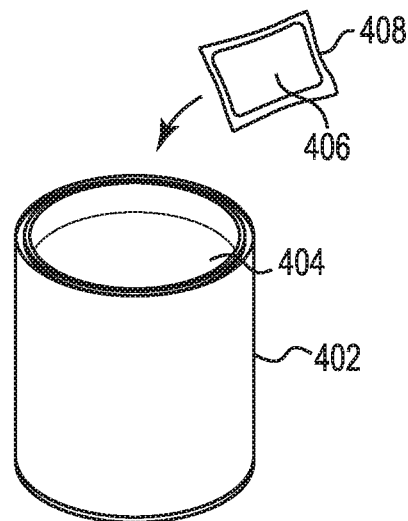
FIG. 4 is a schematic view of the addition to a container of a base paint or stain of a synergist in a sachet.

FIG. 4 is a schematic view of the addition to a container 402 containing a solvent-borne base paint or stain 404 of a siccative and synergist 406 in a plastic film sachet 408. Sachet 408 may be made from a variety of solvent-soluble materials such as polyvinylpyrrolidone/vinyl acetate copolymers. If desired, sachet 408 may be made from a material with solvent solubility but little or no water solubility so as to enable retrieval of the intact sachet if it is accidentally dropped into a container of a water-borne paint or stain. Sachet 408 may if desired be sized for use in a smaller (for example, 1 quart) standard container and multiple such sachets may be used when tinting the contents of a larger (for example, 1 gallon) standard container.

Figure 5:
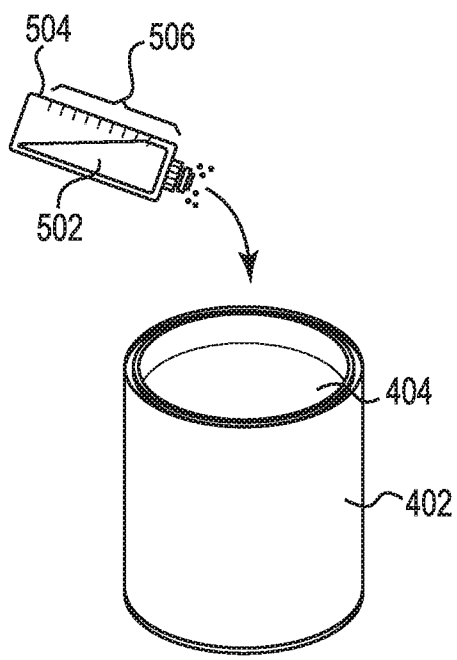
FIG. 5 is a schematic view of the addition to a container of a base paint or stain of a synergist from a squeeze bottle.

FIG. 5 is a schematic view of the addition to container 402 and solvent-borne base paint or stain 404 of a mixture containing synergist and siccative 502 contained in a squeeze bottle 504. Index marks 506 or the contents level in container 402 may be used to gauge the amount of synergist and siccative mixture added to container 402.

Figure 6:
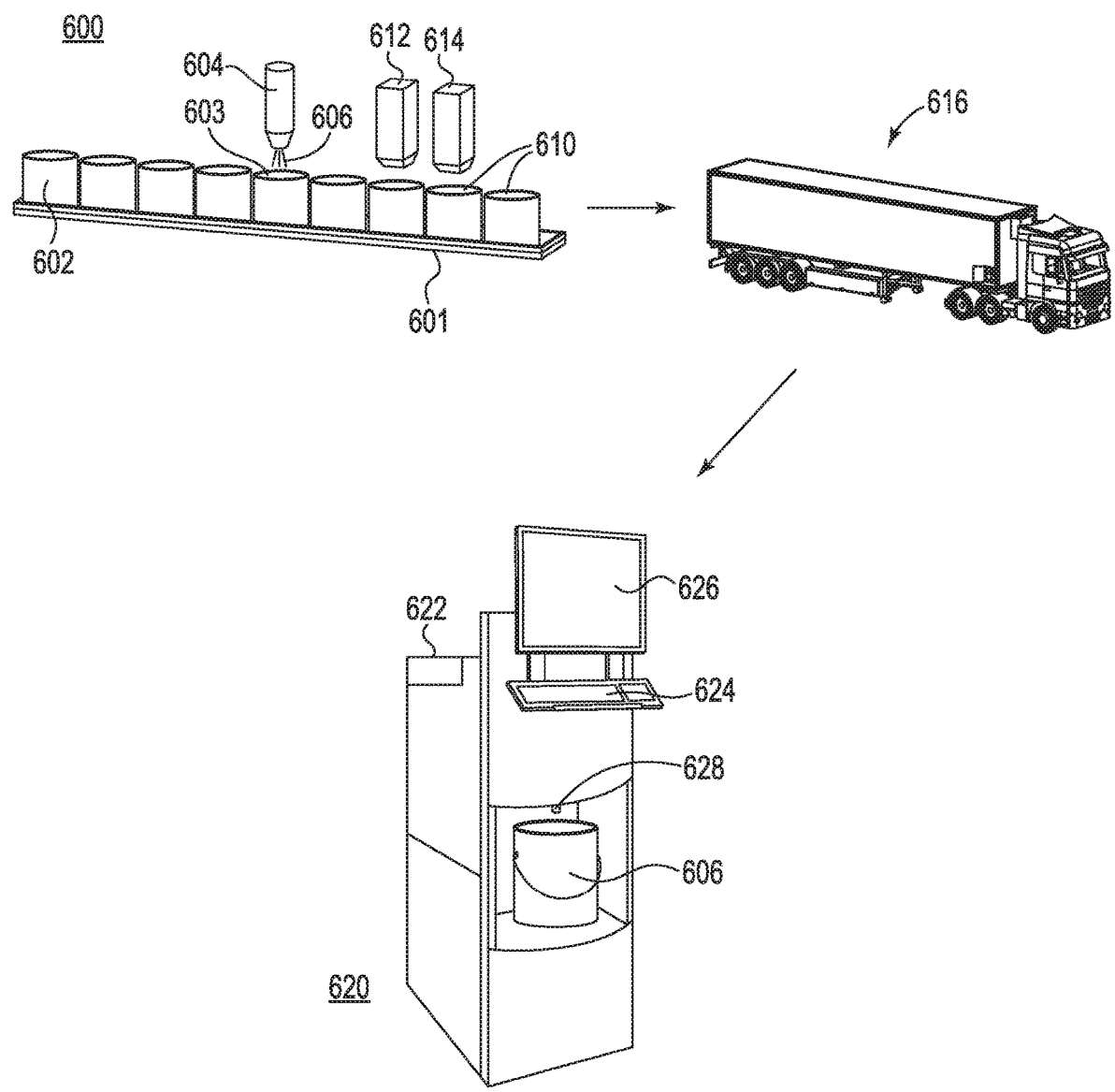
FIG. 6 is a schematic view of the factory addition of a synergist to a base paint or stain, followed by shipment of the synergist-containing base paint or stain to a point-of-sale retail, wholesale or combined retail/wholesale outlet for subsequent tinting.

FIG. 6 is a schematic perspective view of a paint factory filling and packaging line 600 including conveyor 601 for transporting containers 602, which are largely but incompletely filled with solvent-borne base paint or stain 603, past filling station 604 where synergist 606 is added to paint or stain 603. In one embodiment, solvent-borne base paint or stain 603 does not contain one or more of the ingredients (e.g., siccatives) prior to point-of-sale system 620. For example, solvent-borne base paint or stain 603 may be manufactured substantially free of or completely free of any siccatives and optionally substantially free of or completely free of antiskinning agents. As discussed above, conventional air-oxidizable solvent-borne base paint or stains typically contain a siccative intended to improve the overall drying properties of the base paint or stain. However, even when such conventional solvent-borne base paint or stain include such siccatives, such products have been found to exhibit inadequate drying properties upon the inclusion of a siccative-free synergist. Additionally, with some conventional solvent-borne base paint or stains, the shelf-life of the base may be diminished due to skinning of the product prior to the point-of-sale. Skinning is the result of premature hardening of the paint or stain through autooxidation in which the product forms a skin on the surface of the paint or stain during storage. Increasing the siccative content in the base paint or stain at the point of manufacture can exasperate the skinning effect and further diminish the shelf life of the product prior to reaching the consummer. By adding the siccatives at the point-of-sale (e.g., at system 620) the shelf-life of the base solvent-borne paint or stain 603 can be increased and the drying and tack times of the tinted paint or stain sold to the consumer can be reduced and to within desirable ranges. Further, by formulating the solvent-borne base paint or stain 603 to be substantially or completely free of siccative, skinning of unopened base paint or stain can be inhibited or eliminated. Additionally, or alternatively, antiskinning agents that have been added to help reduce skinning of the base paint or stain during storage may be reduced or eliminated from solvent-borne base paint or stain 603. Examples of antiskinning agents may include volatile ligands such as methylethyl ketone oxime (MEKO), that are configured to bind to siccatives during storage to inhibit their action and then themselves slowly volatilize after application to permit the siccatives to function as desired.

In another embodiment, solvent-borne base paint or stain 603 may, prior to the addition of synergist at filling station 604, already contain one or more of the ingredients found in the synergist, siccative, or both, but does not contain sufficient amounts of such ingredients to satisfactorily disperse water-only fluid colorants from the array if added in amounts sufficient to fill the available headspace in container 602, or to sufficiently dry the material paint or stain upon final application to a substrate. Lids 610 are installed at capping station 612 and closed at pressing station 614. The resulting factory-filled, synergist-containing solvent-borne base paint or stain containers are shipped using for example truck 616 to a point-of-sale retail, wholesale or combined retail/wholesale outlet 620. At outlet 620, automated dispensing machine 622 equipped with a keyboard 624 and monitor 626 may be used to dispense water-only fluid colorants and siccative(s) through spout 628 into containers 606 at the point-of-sale.

A variety of liquid base paints and stains may be used in the disclosed system and method, and will be familiar to persons having ordinary skill in the art. The base paints and stains normally will contain one or more polymeric binders and one or more pigments, and may in addition contain one or more vehicles or carriers and one or more adjuvants. Exemplary water-borne binders may for example include latex polymers and water-dispersible binders. Such water-dispersible binders may be water-dispersible as is, or may be water-dispersible following the addition of a suitable neutralizing agent such as ammonia or an amine. Exemplary solvent-borne binders may for example include solution polymers. Because appropriate chemical modifications may be used to convert a solution polymer to a water-dispersible polymer, is best to focus on polymer types broadly rather than categorizing any given polymer as being water-borne or solvent-borne. Representative binder polymers accordingly include but are not limited to acrylic copolymers, alkyd resins and other drying oil modified polymers including polyesters and polyurethanes, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, polyamides, epoxy esters, polyureas, polyurethanes, polysiloxanes, silicones, fluorinated copolymers such as vinylidene fluoride, and compatible blends of any of the above polymeric binders. The base paints or stains may include a component or components of a multicomponent (e.g., two component) reactive system for the binder such as a component of an isocyanate-polyamine, isocyanate-polyol, epoxy-polyamine, carbodiimide-polyacid, aziridine-polyacid, melamine-polyol, or urea formaldehyde-polyol system. The binder may for example represent about 5 to about 99 volume percent of the dried coating volume. The volume solids, as defined by the fractional volume of dry paint ingredients in the as-supplied wet base paint or stain, may for example represent about 5 to about 80 volume percent of the base paint. The glass transition temperature for the polymeric binder may for example be about −20 to about 60° C. The base paint or stain viscosity may for example be about 40 to about 140 Krebs units.

A variety of pigments may be employed in the base paints and stains, and will be familiar to persons having ordinary skill in the art. The pigments desirably form a stable dispersion that does not require agitation prior to use. In some instances a suitable pigment may also or instead be referred to commercially as a dye. Exemplary pigments include treated or untreated inorganic pigments and mixtures thereof, for example metallic oxides including titanium dioxide, iron oxides of various colors (including black) and zinc oxide; and metallic flakes such as aluminum flakes, pearlescent flakes, and the like. Exemplary pigments also or instead include treated or untreated organic pigments and mixtures thereof, for example carbon black, azo pigments, benzimidazolinones, carbazoles such as carbazole violet, indanthrones, isoindolinones, isoindolons, perylenes, phthalocyanines, quinacridones and thioindigio reds. Suitable pigments are commercially available from a variety of commercial suppliers including BASF, the LANXESS Inorganic Pigment Business Unit of Bayer Corp., Cabot Corp, Ciba Specialty Chemicals, Clariant, Ferro Corporation, Shepherd Color Company, Sun Chemical and Tomatec America, Inc. Other exemplary pigments are described, for example, in U.S. Pat. No. 8,141,599 B2 (Korenkiewicz et al.), U.S. Pat. No. 8,746,291 B2 (Hertz et al.), U.S. Pat. No. 8,748,550 B2 (Cavallin et al.) and U.S. Pat. No. 8,752,594 B2 (Gebhard et al.). The pigments are used in one or both of the base paint or stain and colorants in amounts sufficient to provide a suitably tinted and if need be suitably opaque cured final paint, stain or industrial coating at the desired coating thickness level, e.g., at pigment volume concentrations of about 0 to about 95 volume percent of the base paint or stain.

The pigments may be supplemented with extenders or fillers such as talc, china clay, barytes, carbonates, silicates and mixtures thereof, for example magnesium silicates, calcium carbonate, aluminosilicates, silica and various clays; organic materials including plastic beads (e.g., polystyrene or polyvinyl chloride beads), microspherical materials containing one or more voids, and vesiculated polymer particles (e.g., those discussed in U.S. Pat. Nos. 4,427,835, 4,920,160, 4,594,363, 4,469,825, 4,468,498, 4,880,842, 4,985,064, 5,5157,084, 5,041,464, 5,036,109, 5,409,776, and 5,510,422). Other exemplary extenders or fillers include EXPANCEL™ 551DE20 acrylonitrile/vinyl chloride expanded particles (from Expancel Inc.), SIL-CEL™ 43 glass micro cellular fillers (from Silbrico Corporation), FILLITE™ 100 ceramic spherical particles (from Trelleborg Fillite Inc.), SPHERICEL™ hollow glass spheres (from Potter Industries Inc.), 3M ceramic microspheres including grades G-200, G-400, G-600, G-800, W-210, W-410, and W-610 (from 3M), 3M hollow microspheres including 3M Performance Additives iM30K (also from 3M), INHANCE™ UH 1900 polyethylene particles (from Fluoro-Seal Inc.), and BIPHOR aluminum phosphate (from Bunge Fertilizantes S. A., Brazil).

Water-borne base paints or stains include water and optionally may include one or more cosolvents. The water may for example be tap water, deionized water or distilled water. Water-borne base paints or stains may for example contain sufficient water so that at least about 20 or at least about 35 and up to about 80 or up to about 65 wt. % solids are present when the tinted paint or stain is applied to a substrate. Cosolvents may assist in mixing or coating a water-borne base paint or stain; may speed up, retard or otherwise change the time or emissions associated with drying; may improve wet edge properties or overlap characteristics; may improve freeze-thaw protection, or may provide or improve other features, and generally will not be retained in a film of the dried, cured or otherwise hardened paint or stain. A chosen cosolvent may be a hazardous air pollutant solvent (HAPS material) but preferably is a non-HAPS material or is substantially free of HAPS materials. Exemplary cosolvents typically have low molecular weights (e.g., up to about 700, up to about 600, up to about 500 or up to about 400 g/mol) and may for example include glycols (e.g., ethylene glycol, diethylene glycol, triethylene glycol, tetraethylene glycol and propylene glycol), glycol ethers (e.g., DOWANOL™ DPM and Butyl CELLOSOLVE™ from Dow Chemical Co.), alcohols (e.g., methanol, ethanol, n-propanol, isopropanol, n-butanol, isobutanol, 2-methyl butanol, isoamyl alcohol and other primary amyl alcohol isomers, n-pentanol, 2-ethylhexanol, 4-hydroxy-2,6,8-trimethylnonane and diisobutyl carbinol), esters and ester alcohols (e.g., isopropyl acetate; n-butyl acetate; isobutyl acetate; n-propyl acetate; primary amyl acetate mixed isomers, and UCAR™ Ester EEP from Dow Chemical Co.), ketones (e.g., diisobutyl ketone and ECOSOFT™ Solvent IK from Dow Chemical Co.), CARBOWAX™ 300 and CARBOWAX 600 polyethylene from Dow Chemical Co., mixtures thereof and the like. When a cosolvent is present, the coating compositions may for example contain at least about 0.1 or at least about 2 wt. % cosolvent and up to about 10 or up to about 5 wt. % cosolvent based on the tinted paint or stain weight.

The disclosed water-borne base paints and stains preferably are low VOC solutions or dispersions. They may for example contain zero to less than 8 wt. % VOCs, more preferably less than 6 wt. % VOCs, yet more preferably less than 4 wt. % VOCs, and most preferably less than 2 wt. % VOCs based upon the total liquid composition weight.

Solvent-borne base paints or stains may include one or more solvents. The solvent may function as a carrier for the other components of the base paint or stain or may facilitate the blending of colorants or additional ingredients into the base paint or stain. The chosen solvent may depend in part on the chemical makeup of the base paint or stain binder. Exemplary solvents include aliphatic and aromatic solvents, such as mineral spirits, xylene, ketones, glycol ethers, organic esters, alcohols, ethylene or propylene glycols and other aromatic compounds. Mixtures of solvents may be employed, for example, aromatic distillates may be combined with glycol ethers or alcohols. A solvent-borne base paint or stain may for example contain at least about 20 or at least about 30 wt. % solvent, and up to about 50 or up to about 45 wt. % solvent based on the total composition weight.

An optional reactive diluent or resin may be included in the base paint or stain. The reactive diluent or resin may function as a carrier for the other components of the base paint or stain, may facilitate the blending of colorants or additional ingredients into the base paint or stain, may increase the solids content at application without increasing the coating viscosity or VOC content, or may enhance (in some cases, synergistically) various coating performance characteristics such as adhesion, hardness and chemical resistance. Suitable reactive diluents or resins include polymerizable monomers (for example, acrylic or methacrylic monomers), vinyl resins, acrylic resins, epoxy resins, oligomers, polyether polyols, and a variety of low molecular weight polyfunctional resins. If employed, a reactive diluent or resin may for example represent at least about 0.1, at least about 0.5 or at least about 1 wt. %, and up to about 20, up to about 15 or up to about 10 wt. % based on the weight of ingredients in the tinted paint or stain.

Water-borne base paints or stains typically will contain one or more dispersing agents and one or more surfactants. Exemplary dispersing agents include anionic polyelectrolyte dispersants such as maleic acid copolymers, acrylic acid copolymers including methacrylic acid copolymers, and carboxylic acids such as tartaric acid, succinic acid, citric acid, itaconic acid, mixtures thereof and other materials that will be familiar to persons having ordinary skill in the art. Exemplary surfactants include anionic, amphoteric and non-ionic materials. There may be some overlap in nomenclature when certain dispersants or surfactants are identified in commercial literature. Suitable dispersants and surfactants are commercially available from a variety of suppliers including 3M, Air Products and Chemicals, Inc., Akzo Nobel, Ashland, BASF, Dow Chemical Co., E. I. DuPont de Nemours and Co., Elementis Specialties, Inc., Harcros Chemicals, Rhodia and Solvay, such as the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, Inc. and others, various members of the SURFYNOL™ series from Air Products and Chemicals, Inc. (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E. I. DuPont de Nemours and Co. and other suppliers, and phosphate esters from Ashland, Rhodia and other suppliers. When a surfactant or dispersant is present, the base paint or stain may for example contain at least about 0.1, at least about 0.5 or at least about 1 wt. % surfactants or dispersants, and up to about 10, up to about 5 or up to about 3 wt. % surfactants or dispersants based on the total composition weight.

The base paint or stain may contain a variety of other adjuvants that will be familiar to persons having ordinary skill in the art. Representative adjuvants are described in Koleske et al., Paint and Coatings Industry, April, 2003, pages 12-86. Exemplary adjuvants and commercial examples of the same include anti-cratering agents; biocides, fungicides, mildewcides and preservatives (e.g., BUSAN™ 1292 from Buckman Laboratories, Inc., NOPCOCIDE™ N-40D from Cognis, KATHON™ LX from Rohm & Haas, and POLYPHASE™ 663, POLYPHASE 678 and POLYPHASE PW-40 from Troy Corporation); coalescing agents (e.g., those described in U.S. Pat. No. 8,110,624 B2 to Brandenburger et al.); curing indicators; heat stabilizers; leveling agents; light stabilizers (e.g., hindered amine light stabilizers such as TINUVIN™ 123-DW and TINUVIN 292 HP from Ciba Specialty Chemicals); optical brighteners; ultraviolet light absorbers (e.g., TINUVIN 234 and TINUVIN 1130 from Ciba Specialty Chemicals); wetting agents (e.g., BYK™ 346 and BYK 348 from Altana, PENTEX™ 99 from Rhodia and TROYSOL LAC™ from Troy corporation); waxes (e.g., AQUACER™ 593 from Altana, HYDROCER™ 303 from Shamrock Technologies, Inc. and MICHEM™ Emulsion 32535 from Michelman, Inc.); and the like. The types and amounts of these and other adjuvants typically will be empirically selected.

Exemplary commercially-available water-borne base paints and stains that can be used in the disclosed system include ARMSTEAD™, CORAL™, DULUX™ TRADE™ and FLEXA™ emulsion paints from Akzo Nobel; BEHR™, BEHR MARQUEE™ and BEHR PREMIUM™, PREMIUM PLUS™ and PREMIUM PLUS ULTRA™ latex paints from Behr Process Corporation; BENJAMIN MOORE™, BENJAMIN MOORE ADVANCE™, BENJAMIN MOORE AURA™, BENJAMIN MOORE BEN™, BENJAMIN MOORE NATURA™ and BENJAMIN MOORE SELECT™ latex paints from Benjamin Moore & Co.; GLIDDEN™, GLIDDEN PREMIUM™, GLIDDEN HIGH ENDURANCE™, GLIDDEN SPRED™, GLIDDEN DIAMOND™, MANOR HALL™, PORTER™, REGENCY™, WONDER-PURE™ and WONDER-TONES™ latex paints from PPG Industries, Inc.; and A-100™, DURATION™, DURAMAX™, EMERALD™, INFINITY™, MEDALLION, OPTIMUS™, OVATION™, PRISTINE™, RESERVE™, RESILIENCE™, SHERWIN-WILLIAMS™, SHOWCASE™, SUPERPAINT™, SIGNATURE™, ULTRA™, and VALSPAR™ latex paints and MINWAX™ Water Based Wood Stains from Sherwin-Williams.

Exemplary commercially-available solvent-borne base paints and stains that can be used in the disclosed system include GREAT FINISHES™ stains from Ace Hardware Corporation; DULUX™ and (outside the US) GIDDEN™ alkyd paints from Akzo Nobel; BEHR™ alkyd paints from Behr Process Corporation; oil-based stains from McCormick Paints; MOORE SATIN IMPERVO™ alkyd paint from Benjamin Moore & Co.; WEATHER-SHIELD™ alkyd paints from Kelly-Moore Co., alkyd paints from Huaron Paints (China); BAR-OX™, VELOUR™ and (outside the US) GLIDDEN™ alkyd paints from PPG Industries, Inc.; SHERWIN-WILLIAMS PROCLASSIC™ and VALSPAR ULTRA 4000™ alkyd paints and CABOT™, MINWAX and MINWAX WOOD FINISH™ stains from Sherwin-Williams; and PERMO-PAVE™ alkyd paints from Wattyl Australia Pty. Ltd.

The base paints and stains typically will be packaged in containers suitable for point-of-sale mixing of small batch lots in custom colors and subsequent sale in the same container to the end user of a custom-tinted paint or stain. Exemplary small batch lot base paint or stain container sizes are about one half pint, one pint, one quart, one liter, one gallon, four liter, five gallon or 20 liter containers, corresponding to base paint or stain containers from about 0.2 to 20 L. The base paint or stain container typically will be equipped with a removable lid, cap or other closure for an opening through which colorant may be dispensed into the base paint or stain. Depending on the amount of pigment already present in a base paint or stain, the base paint or stain container typically will have a small headspace (e.g., about 1 to about 15% of the container volume) for colorant addition. For example, a nominal one gallon (3.79 L) clear base paint or stain container may hold up to about 112 fluid ounces (3.31 L) or up to about 116 fluid ounces (3.43 L) of the base paint or stain, respectively leaving at least about 16 fluid ounces (0.47 L or about 13% of the total container volume) or at least about 12 fluid ounces (0.35 L or about 9% of the total container volume) available for colorant addition. A nominal one gallon (3.79 L) white base paint or stain container may for example hold about 128 fluid ounces (3.79 L) of the base paint or stain, with only a small headspace (e.g., about 0.04 L or about 1% of the total container volume) available for colorant addition. When additional base paints or stains of intermediate lightness are employed, they likewise may have intermediate available headspace volumes for colorant addition. For example, a three base system may employ the white and clear base paints or stains mentioned above, together with a gray base whose container has up to about 120 fluid ounces (3.55 L) or up to about 124 fluid ounces (3.57 L) of base paint or stain with at least about 8 fluid ounces (0.24 L) or at least about 4 fluid ounces (0.12 L) of headspace available for colorant addition. Additional high chroma base paints or stains (e.g., deep red, deep blue or deep yellow base paints or stains) may be employed if desired for making strongly-tinted custom paint shades with potential one coat hiding power.

A variety of colorants may be used in the disclosed system and method, and will be familiar to persons having ordinary skill in the art. The colorants normally will contain one or more pigments, one or more vehicles or carriers and one or more pigment dispersing agents or surfactants, and will be in the form of pourable liquids. The colorants typically will not contain film-forming binders, and should be combined with a base paint or stain in order to provide a durable dried or cured finish. Suitable pigments include those discussed above. Colorants or colorant arrays containing entirely inorganic pigments or pigment mixtures may be preferred where custom-tinted paints or stains having maximum exterior durability are desired. Suitable vehicles or carriers include water and the cosolvents discussed above. Suitable pigment dispersing agents and surfactants include those discussed above. The colorant may for example contain at least about 30, at least about 40 or at least about 50 wt. % pigment and up to about 90, up to about 80 or up to about 70 wt. % pigment. The colorant may for example contain at least about 10, at least about 20 or at least about 30 wt. % vehicles or carriers, and up to about 70, up to about 60 or up to about 50 wt. % vehicles or carriers. The colorant may for example contain at least about 0.1, at least about 0.5 or at least about 1 wt. % surfactants or dispersants, and up to about 20, up to about 15 or up to about 10 wt. % surfactants or dispersants based on the total colorant weight. The colorants may also contain one or more adjuvants. Suitable adjuvants include those discussed above. The colorants preferably are non-settling and low VOC.

Exemplary water-only fluid colorants that may be used in the disclosed system are produced by a number of manufacturers including Akzo Nobel, BASF, Clariant, Color Corporation of America (a subsidiary of the present assignee), CPS Color, Inc., Evonik Industries, ICI, PPG and Sherwin-Williams, such as the NOVOCOLOR™ HPII 8600 and NOVOCOLOR HP 8900 colorant lines from Color Corporation of America, the GENNEX™ colorant line from Benjamin Moore and the ECOTONER™ colorant line from Sherwin-Williams. The chosen colorants may include all or a portion of a particular product array. For example, an array of water-only colorants including at least white, green, blue and red colorants may be selected from the above-mentioned NovoColor HP 8900 product line by selecting no. 8900

White, either or both of no. 8920 or 8921 Phthalo Green, either or both of no. 8930 or 8932 Phthalo Blue, and either or both of no. 8942 Interior Red or 8951 Exterior Red. Additional colorants may, subject to the availability of suitable dispenser slots, be added to the array as desired. Exemplary such additional colorants include one or more yellow, orange, magenta, brown or black colorants from the colorant manufacturers mentioned above.

The disclosed system and method may for example employ 5, 6, 7, 8, 9, 10, 11, 12, 13, 14 or 15 colorants, but may employ as few as four colorants if a restricted (viz., relatively few hues and relatively low gamut) color space is acceptable. The disclosed system may employ more than 15 colorants if sufficient dispenser slots are available and additional colorant SKUs are acceptable. For example, the disclosed system and method may employ 16, 17, 18, 19, 20, 21, 22, 23 or 24 colorants.

When the available number of colorant dispenser canisters is limited (e.g., when using a 12 or fewer canister dispenser), the number of colorant SKUs may be reduced by recognizing that some individual colorants are themselves mixtures of pigments which may be replaced with a precisely-metered blend of individual colorants. For example, many custom color paint systems employ one or more earth-tone colorants variously referred to using names such as brown oxide, raw umber or umber. Although brown oxide colorant is sometimes referred to as being made from a single pigment (e.g., PBr7 natural iron oxide), it may actually have been made using a blend of red and yellow oxides (e.g., PR101 red iron oxide and PY42 yellow iron oxide) shaded with carbon black (e.g., PBk7 carbon black) to match a specific color target. Raw umber or umber earth-tone colorants (which may collectively be referred to as "raw umber" colorants) likewise may have been made from a blend of colored oxides and carbon black. These blends may be replaced by adding colorants wholly made from (or substantially wholly made from) appropriate individual pigments, so as to provide a paint or stain whose coloration is like the coloration that would be obtained using a traditional blended pigment colorant. This may be done by using an automated colorant dispenser having a suitably low minimum fluid dispensing quantity (e.g., a minimum fluid dispensing quantity less than 0.01 fluid ounce (<0.3 mL)) so as to enable dispensing of small quantities of the individual colorants. Further details regarding the manner in which such blends may be dispensed may be found in the above-mentioned U.S. Pat. No. 8,141,599 B2. For example, a blend made using precisely-metered small amounts of yellow oxide pigment, red oxide pigment and black pigment may be dispensed into the base paint or stain whenever a tinted paint or stain with a brown oxide or raw umber tint is required.

The disclosed colorants desirably have PVC values of at least about 0.1 vol. %, at least about 0.5 vol. % or at least about 1 vol. %, and up to about 25 vol. %. The amount of colorant(s) dispensed into a 1 gallon (3.78 L) nominal container of base paint or stain will vary in part depending on the base paint, stain or colorant PVC values and may for example range from about 0.00065 fluid ounces (0.19 mL) to about 16 fluid ounces (473 mL) of colorant addition, with larger amounts typically being employed in a clear base paint or stain or in a larger base paint or stain container, and smaller amounts typically being employed in a white base paint or stain or in a smaller base paint or stain container. The finished tinted paints or stains may for example have PVC values of at least about 0.5 or at least about 1 vol. %, and may for example have PVC values of up to about 85 vol. % or up to about 50 vol. %.

The colorant array may if desired include one or more solvent-borne colorants. Preferably however, all of the colorants in the array and in the colorant dispenser are water-borne colorants. In one preferred embodiment, the majority or even all of the colorants in the array and in the colorant dispenser are water-only fluid colorants. In other preferred embodiments, less than two, less than one or none of the colorants in the array and in the colorant dispenser are compatible with alkyd paints and stains, and the remaining colorants in the array will exhibit visually objectionable rub-up or insufficient tint strength if dispensed into such alkyd paints and stains without the synergist in representative tinting amounts of about 1 to about 15% of the alkyd paint or stain container volume.

The colorants (and optionally the synergist, siccative, or mixture thereof) typically will be packaged in containers suitable for use in the chosen colorant dispenser(s), and sold to the dispenser owner or operator in a point-of-sale custom tinting facility rather than to the end user of a custom-tinted paint or stain. Exemplary small batch lot container sizes are about 0.5, 1, 2 or 3 quarts; about 1 gallon; or about 0.5, 1, 2, 3, 4 or 5 liters, corresponding to containers from about 0.5 to about 5 L. Exemplary containers include boxes, cans, cartridges, jars, pouches (e.g., sealed pouches made of metal or plastic), squeeze bottles, syringes, tubes (e.g., collapsible tubes such as toothpaste-style tubes made of metal or plastic, and more rigid tubes equipped with movable pistons or plungers such as caulking-style tubes made of metal, plastic or paper) and other containers in which the colorants, synergists, and siccatives can be sealed for storage and shipment and, when needed to replace an empty container, placed in an appropriate slot or other receptacle or poured into an appropriate hopper or other vessel in the colorant dispenser so that respective material may be dispensed by the colorant dispenser in controlled amounts. The colorants, synergist, and siccative may be supplied to the dispenser owner or operator in a can or other sealed container designed to be opened using a can opener or other can-puncturing device. The containers may be equipped with a manually-openable closure such as an openable and recloseable cap, or may be equipped with an irreversibly openable closure such as a tear-off seal or rupturable septum. In any event, once the container has been opened, colorant may be supplied to the colorant dispenser and thence into the base paint or stain container. Desirably the container, colorant dispenser or both have a nozzle, adapter orifice or other design which facilitates clean entry of the colorant, siccative, or synergist into the colorant dispenser with minimal spillage or waste before or after use. As supplied to the dispenser owner or operator, the container typically will include little or no headspace.

Suitable siccatives that may be used in the disclosed system and methods include metal-organic compounds that catalyze hardening of the air oxidizable solvent-borne base paints and stains. In some embodiments, siccatives may include metal carboxylate driers such as organometallic salts derived from salts or coordination compounds of hydrocarbon carboxylates with metal ions. The metallic raw material and one or more organic acids may be dissolved in a diluent to produces the organometallic salt. Exemplary organic acids may be natural or synthetic. Natural organic acids may include, but are not limited to, naphthenates (e.g., petroleum based derivatives), fatty acids (e.g., unsaturated oleates), tallates, and the like. Synthetic organic acids may include, but are not limited to, 2-ethylhexanoate, neodecanoate, isononanoates, and the like. In some examples, siccatives may be characterized as oil-drying agents or Japan driers because they help reduce the drying or cure times of solvent-borne base paints or stains.

The siccative material may include one or more auxiliary, primary, or through drier materials. Primary driers function mainly by drying the surface of the coating composition (e.g., skinning) while leaving the coating underneath wet. Through driers can help ensure that the coating dries at a uniform rate throughout the body of the film not just at the surface by, for example, linking fatty acid chains in the composition via oxygen-metal-oxygen bridges leading to crosslink connections in the coating. Auxiliary driers are useful to modify the effects of other drier materials. Examples of primary drier metals which can be used as the siccative material may include, but are not limited to, cobalt, manganese, iron, and vanadium. Examples of through drier metals which can be used as the siccative material may include, but are not limited to, aluminum, cerium, lithium, neodymium, potassium, strontium, and zirconium. Examples of auxiliary drier metals which can be used as the siccative material may include, but are not limited to, calcium, barium, and zinc. In preferred examples, the siccative may include one or more cobalt or iron based siccatives.

Additionally, or alternatively, it may be desirable to select a siccative that exhibits reduced color properties such that the inclusion of the siccative does not alter the color performance of base paint or stain or the added colorant. Iron based siccatives may be particularly preferred for light colored paints or stains due to their compatible or inconspicuous color characteristics and robust drying characteristics. Other siccatives, such as cobalt based siccatives may have a slightly colored (e.g., non-white) appearance and may be better suited in darker colored paints or stains. In some embodiments, the custom color system may include at least two synergists, one being configured for use in light colored paints or stains (e.g., shades of white, pastel colors, or the like) and one being configured for use in dark colored paints or stains. Additionally, or alternatively, the custom color system may include more than one different synergist, each being optimized for use with paint or stain, or optimized for use with different commercially available base paints or stains (e.g., different branded product lines of base paints or stains).

The siccative may be added to one or more of the above described containers alone or may be mixed with the synergist and stored together in one or more of the containers. The disclosed synergists may contain a variety of surfactants, optional dispersing agents, and optional cosolvents. Exemplary such materials include ingredients that have been used or recommended for use in universal paint colorants, such as those described in U.S. Pat. No. 2,878,135 (Willis), U.S. Pat. No. 6,287,377 B1 (Binns et al.), U.S. Pat. No. 7,659,350 B2 (Coward et al.), U.S. Pat. No. 9,080,030 B2 (Amiel et al.), U.S. Patent Application Publication No. US 2016/0333213 A1 (Zhou et al.) and Published International Application No. WO2016040641 A1 (Donlon et al.). The synergist preferably includes low VOC materials but in view of their intended use in solvent-borne base paints and stains are not required. In certain preferred embodiments the synergist will include and one or more (preferably two or more) surfactants, with the surfactants being selected to provide improved colorant compatibility across a range of solvent-borne base paint or stain binders, or within an array of water-only fluid colorants. In additional embodiments the synergist optionally may also include one or more dispersing agents, one or more cosolvents, or one or more dispersing agents and one or more cosolvents. The surfactants and optional dispersing agents may be solids or liquids. As will be appreciated by persons having ordinary skill in the art, the optional cosolvents will be liquids, and preferably low VOC liquids. When solid surfactants or solid optional dispersing agents are employed, they may if desired be combined with a liquid surfactant, dispersing agent, cosolvent or conventional carrier or solvent (preferably a low VOC carrier or solvent) to provide a liquid synergist.

Suitable synergists may be selected in a variety of ways, including empirical testing to identify surfactants, siccatives, dispersing agents or cosolvents that render the individual members of the desired water-only colorant array compatible with the desired base paints and stains; by selecting ingredients that have previously been used in universal colorants used in the paint and stain industry; or by choosing surfactants, siccatives, dispersing agents or cosolvents based upon structural considerations such as hydrophilicity, oliophilicity and the ability of the synergist to pull a water-only colorant into a solvent phase.

Suitable surfactants for use in the synergist include nonionic, anionic, cationic or amphoteric surfactants. Nonionic surfactants are presently preferred. Anionic, cationic or amphoteric surfactants may be used with some water-only fluid colorants, especially if used in combination with one or more other synergists.

In some embodiments, the siccative(s) and synergist(s) may be combined together as a pre-mixed mixture. The siccative may be combined with the synergist in an amount sufficient to provide desirable drying times (e.g., about 1 to about 12 hours and may depend if the base paint or solvent is a quick dry or traditional dry material) of the solvent-borne base paint or stain to which it is added. In some embodiments, the resultant mixture of siccative and synergist may comprise about 0.01 wt. % to about 20 wt. % total siccative, about 0.01 wt. % to 10 wt. %, or about 1 wt. % to about 5 wt. % siccative. Additionally, or alternatively, the siccatives may be mixed with synergist such that after being added to or dispersed within a tinted base paint or stain, the paint or stain comprises about 0.5 wt. % to about 10 wt. % total siccative based on a dry solids basis.

In some embodiments, the resultant mixture comprise, primarily or exclusively, synergist and siccative, with the synergist comprising, primarily or exclusively, one or more ingredients that will disperse the water-only colorants into solvent-borne base paints. In some examples, the mixture may contain about 10 wt. % to about 100 wt. % of siccatives and surfactants, and more preferably 65 wt. % to about 85 wt. % of siccatives and surfactants as measured on a dry solids basis.

Exemplary cosolvents for use in the disclosed synergist and siccatives include the cosolvents discussed above. Glycols (e.g., ethylene glycol and diethylene glycol), glycol ethers (e.g., DOWANOL™ DPM and Butyl CELLOSOLVE™ from Dow Chemical Co.), alcohols (e.g., n-propanol, isopropanol, n-butanol, isobutanol, 2-methyl butanol, isoamyl alcohol and other primary amyl alcohol isomers, n-pentanol, 2-ethylhexanol, 4-hydroxy-2,6,8-trimethyl-nonane and diisobutyl carbinol), esters and ester alcohols (e.g., isopropyl acetate; n-butyl acetate; isobutyl acetate; n-propyl acetate; primary amyl acetate mixed isomers, and UCAR™ Ester EEP from Dow Chemical Co.) represent preferred cosolvents, and ethylene glycol and diethylene glycol represent especially preferred cosolvents. The cosolvents preferably are (but in view of their intended use in solvent-borne base paints and stains are not required to be) low VOC materials.

Exemplary dispersing agents for use in the disclosed synergist include monomeric, oligomeric or polymeric materials that may assist in dispersing the colorant pigments into solvent-borne base paints and stains. The dispersing agents preferably are (but in view of their intended use in solvent-borne base paints and stains are not required to be) low VOC materials. There may be some overlap in materials that may be designated as dispersing agents for use in or as the disclosed synergist and materials that may have been designated in other contexts for use as cosolvents. With that in mind, exemplary dispersing agents that may be used in or as the synergist include materials such as dioctyl maleate, tributyl citrate, dihydric or polyhydric alcohols, polyethers including polyalkyl glycols and polyhydroxyethers, alcohols including ester alcohols such as TEXANOL™ ester alcohol from Eastman Chemical Company, polyethers including polyalkyl glycols and polyhydroxyethers, modified polyureas, polyalkylene oxides, combinations thereof, and compounds having Formula I shown below:

$$R_1O(C(O))_mA(R_3)(R_4)(C(O))_nR_2 \quad\quad I$$

wherein:
A is a divalent $C_1$-$C_{10}$ alkyl, $C_2$-$C_{10}$ alkylene or $C_3$-$C_{10}$ cycloalkyl radical;
$R_3$ and $R_4$ are independently H, substituted or unsubstituted $C_1$-$C_6$ alkyl, substituted or unsubstituted $C_3$-$C_6$ cycloalkyl, —$OR_5$ or $C(O)OR_5$ radicals, wherein $R_5$ is H or a substituted or unsubstituted $C_1$-$C_6$ alkyl, substituted or unsubstituted $C_3$-$C_6$ cycloalkyl, or $C_1$-$C_6$ alkoxy radical;
$R_1$ and $R_2$ are independently H, —C═O, or a substituted or unsubstituted $C_1$-$C_6$ alkyl radical;
m is 0 or 1; and
n is 0 or 1.

Exemplary compounds of Formula I include the compounds II and III shown below:

II

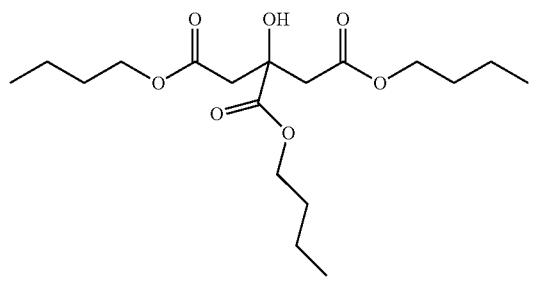

III

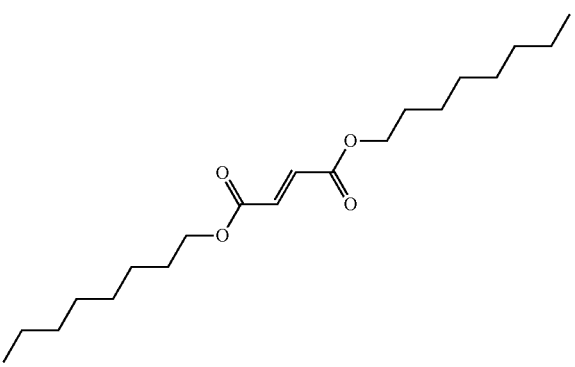

Set out below in Table I are a variety of exemplary surfactants for use in the disclosed synergist formulations, along with an identification of their physical form at room temperature and an indication of their compatibility with alkyd or latex paints. Those shown as being compatible with both alkyd and latex paints may in many instances be used as is. Those that are shown as being compatible only with alkyd paints but not with latex paints may also in many instances be used as is. Those however that are shown as being compatible only with latex paints but not with alkyd paints should be used together with one or more alkyd-compatible surfactants, which normally would be located in the synergist rather than in the colorants. In preferred embodiments, the synergist formulations comprise, consist of or consist essentially of at least one liquid surfactant from Table I and at least one siccative, or a combination of liquid and solid surfactants from Table I that when mixed will provide a liquid dispensable from a canister in a tinting machine and at least one siccative. Additional preferred embodiments are also solvent-free and thereby provide low to zero VOC formulations:

TABLE I

| Item | Description | Physical Form | Alkyd Compat. | Latex Compat. |
|---|---|---|---|---|
| YELKIN ™ TS Soya Lecithin Unbleached (from Archer Daniels Midland Co.) | lecithin | liquid | x | |
| HYDROPALAT ™ WE 3135 (from BASF) | difunctional block copolymer terminating in primary hydroxyl groups | liquid | | x |
| HYDROPALAT WE 3167 (from BASF) | difunctional block copolymer terminating in primary hydroxyl groups | liquid | | x |
| HYDROPALAT WE 3317 (from BASF) | difunctional block copolymer terminating in primary hydroxyl groups | liquid | | x |

TABLE I-continued

| Item | Description | Physical Form | Alkyd Compat. | Latex Compat. |
|---|---|---|---|---|
| TETRONIC ™ 904 (from BASF) | tetrafunctional block copolymer terminating in primary hydroxyl groups | paste | | x |
| BYK ™ 2015 (from Byk Altana) | solution of a structured acrylate copolymer with pigment affinic groups | liquid | | x |
| DISPERBYK ™ 102 (from Byk Altana) | copolymer with acidic groups | liquid | x | x |
| DISPERBYK 190 (from Byk Altana) | solution of a high molecular weight block copolymer with pigment affinic groups | liquid solution | | x |
| DISPERBYK 2091 (from Byk Altana) | modified polyalkoxylate with neutral pigment affinic groups | liquid | x | x |
| DISPERBYK 2095 (from Byk Altana) | salt polyamine amides and polyesters | liquid | x | x |
| CENTROLEX F ™ powder (from Central Soya Company Inc.) | oil-free dry lecithin | Solid | x | |
| HOSTAPHAT ™ 1306 (from Clariant) | phosphate ester | liquid | x | x |
| SMA 1440H (from Cray Valley) | styrene maleic anhydride copolymer solution | liquid solution | x | x |
| AEROSOL ™ OT-100 (from Cytec Industries) | sodium dioctyl sulfosuccinate | solid | x | x |
| TAMOL ™ 165A Dispersant (from Dow Chemical Company) | hydrophobic copolymer polyelectrolyte | liquid | | x |
| TAMOL 731A 25% (from Dow Chemical Company) | Na salt of a maleic anhydride copolymer | liquid solution | | x |
| TERGITOL ™ 15-S-9 Surfactant (from Dow Chemical Company) | secondary alcohol ethoxylate | liquid | x | x |
| SOLEC ™ F Deoiled Soy Lecithin Powder (from DuPont Danisco) | dry lecithin | solid | x | |
| TEGO ™ Dispersant 750 W (from Evonik Resource Efficiency GmbH) | solution of a copolymer with pigment affinic groups | liquid solution | | x |
| SOLSPERSE ™ 67000 (from Lubrizol Corp) | 100% NVM polymeric compatibiliser | liquid | x | x |
| ABEX ™ 2545 (from Rhodia Solvay Group) | proprietary nonionic surfactant | liquid | | x |
| GEROPON ™ 99 (from Rhodia Solvay Group) | sodium dioctyl sulfosuccinate (Solvay) | liquid | x | x |
| GEROPON AS-200 flake (from Rhodia Solvay Group) | sodium cocoyl isethionate | solid | x | x |
| GEROPON SDS (from Rhodia Solvay Group) | sodium dioctyl sulfosuccinate | solid | x | x |
| GEROPON T-22A (from Rhodia Solvay Group) | sodium methyl oleyl taurate | liquid | x | x |
| GEROPON T-77 (from Rhodia Solvay Group) | sodium oleyl N-methyl taurate | solid | x | x |
| LUBRHOPHOS ™ LK 500 (from Rhodia Solvay Group) | linear alcohol ethoxy phosphate | liquid | x | x |

TABLE I-continued

| Item | Description | Physical Form | Alkyd Compat. | Latex Compat. |
|---|---|---|---|---|
| NOVEL™ 23E7 Ethoxylate (from Rhodia Solvay Group) | alcohol ethoxylate | liquid | x | x |
| NOVEL 23E9 Ethoxylate (from Rhodia Solvay Group) | alcohol ethoxylate | liquid | x | x |
| PENTEX™ 99 (from Rhodia Solvay Group) | sodium dioctyl sulfosuccinate | liquid | x | x |
| RHODACAL™ 330 (from Rhodia Solvay Group) | branched isopropylamine dodecylbenzene sulfonate | liquid | x | x |
| RHODACAL BX-78 (from Rhodia Solvay Group) | sodium dibutyl naphthalene sulfonate | solid | x | x |
| RHODACAL DS-10 (from Rhodia Solvay Group) | branched sodium dodecylbenzene sulfonate | solid | x | x |
| RHODACAL IPAM (from Rhodia Solvay Group) | linear isopropylamine dodecylbenzene sulfonate | liquid | x | |
| RHODACAL N (from Rhodia Solvay Group) | sulfonated naphthalene condensate, sodium salt | solid | x | x |
| RHODACAL SSA/A (from Rhodia Solvay Group) | linear sodium dodecylbenzene sulfonate | liquid | x | x |
| RHODAFAC™ PL-6 (from Rhodia Solvay Group) | linear alcohol ethoxy phosphate | liquid | x | x |
| RHODAFAC PL-620 (from Rhodia Solvay Group) | linear alcohol ethoxy phosphate | liquid | x | x |
| RHODAFAC RA-600 (from Rhodia Solvay Group) | linear alcohol ethoxy phosphate | liquid | x | x |
| RHODAFAC RS-410 (from Rhodia Solvay Group) | branched alcohol ethoxy phosphate | liquid | x | x |
| RHODAFAC RS-610 (from Rhodia Solvay Group) | branched alcohol ethoxy phosphate | liquid | x | x |
| RHODAFAC RS-710 (from Rhodia Solvay Group) | branched alcohol ethyoxy phosphate ester | liquid | x | |
| RHODAFAC RS-960 (from Rhodia Solvay Group) | branched alcohol ethoxy phosphate | liquid | x | x |
| RHODASURF™ BC-630 (from Rhodia Solvay Group) | dodecylphenol ethoxylate | liquid | x | x |
| RHODASURF BC-720 (from Rhodia Solvay Group) | tridecyl alcohol ethoxylate | liquid | x | x |
| RHODOLINE™ 3600 (from Rhodia Solvay Group) | 100% NVM proprietary compatibiliser | liquid | x | x |
| RHODOLINE DP5817 (from Rhodia Solvay Group) | proprietary compatibiliser | liquid | x | x |
| SOPROPHOR™ 3D/33 (from Rhodia Solvay Group) | tristyrylphenol ethoxy phosphate | liquid | x | x |
| SOPROPHOR TS-10 (from Rhodia Solvay Group) | ethoxylated tristyrylphenol | liquid | x | x |
| G-3300 Alkyl Aryl Sulfonate (from Stepan Company) | alkyl aryl sulfonate, isopropyl amine salt | liquid | x | |

The disclosed synergist may if desired include one or more additional adjuvants, such as one or more rheology modifiers or thickeners. Other optional adjuvants include but are not limited to adhesion promoters, antioxidants, biocides, buffers, coalescing agents, defoamers, dispersants, dyes, extender fillers, humectants, leveling agents, neutralizers, optical brighteners, pearlescents, plasticizers, polymeric additives, preservatives, reactive diluents, tackifiers, ultraviolet stabilizers (e.g., hindered amine light stabilizers) and waxes. In certain embodiments, the disclosed synergist consists essentially of or consists of surfactants, one or more siccatives, optional dispersing agents, optional cosolvents and optional rheology modifiers or thickeners. For example, the synergist may contain less than 5 wt. % or less than 1 wt. % of any other ingredients.

The synergist, siccative, or mixture thereof may be packaged and shipped in a variety of containers, including those discussed above and in connection with the colorant, or, in the case of the synergist, in connection with the base paint or stain. In some embodiments, the container for the synergist, siccative, or mixture thereof is like that used for the colorants, and can be installed in and dispensed from an available slot in the colorant dispenser. In other embodiments, the synergist, siccative, or mixture thereof is packaged and shipped in a container from which the respective component can be manually dispensed, such as a squeeze bottle as shown in FIG. 5, or in any of a number of other convenient packaging containers that will be familiar to persons having ordinary skill in the art.

Sufficient synergist should be employed to provide the desired degree of colorant dispersion into the solvent-borne base paint or stain to be tinted, while leaving sufficient remaining headspace in the base paint or stain container to permit addition of the desired colorant amount. Expressed on a volumetric basis, exemplary synergist amounts may for example be at least about 2, at least about 4, at least about 6, at least about 8 or at least about 10 mL of synergist per liter of solvent-borne base paint or stain to be tinted, and up to about 60, up to about 50, up to about 40, up to about 30 or up to about 20 mL of synergist per liter of solvent-borne base paint or stain to be tinted. If made containing a combination of ingredients, the synergist preferably provides a stable, homogeneous, non-settling composition that can be mixed into the base paint or stain in such exemplary amounts using a conventional paint stirrer or shaker and without forming visible clumps after mixing.

A variety of manual or automated colorant dispensers may be used in the disclosed system and method, including the COROB™ D50 manual colorant dispenser with a ⅛₄₈ fluid ounce (0.62 mL) minimum dispensing capacity from CPS Color Equipment, Inc., the ACCUTINTER™ 1500, 2000, 7000 and 8000 series automated colorant dispensers with a ⅓₈₄ fluid ounce (0.077 mL) minimum dispensing quantity from Fluid Management, Inc., and the Sample Dispensing System automated colorant dispenser with a ⅟₁₀₂₄ fluid ounce (0.029 mL) minimum dispensing quantity from Fluid Management, Inc. Additional automated paint or stain colorant dispensers include the COROB MODULA HF™ machine with a ⅟₁₉₂ fluid ounce (0.153 mL) minimum dispensing quantity from CPS Color Equipment, Inc., and the TATOCOLOR™ machine with a ⅓₈₄ fluid ounce (0.077 mL) minimum dispensing quantity from CPS Color Equipment, Inc. The chosen dispenser may for example have a minimum fluid dispensing quantity less than 0.01 fluid ounce (<0.3 mL), preferably less than 0.007 fluid ounce (<0.2 mL) and more preferably less than 0.005 fluid ounce (<0.15 mL). Dispensers with even smaller minimum dispensing quantities may be employed, e.g. less than 0.001 fluid ounce (<0.03 mL) or less than 0.0002 (<0.014 mL) minimum dispensing quantities, but such dispensers may also require longer amounts of time to prepare strong colors in large containers.

The disclosed custom-colored architectural paints and stains may be applied to a variety of substrates, e.g., asphalt (including asphalt composition shingles and membranes), cement, cement fiberboard and roofing tiles, ceramics, concrete, fabric, glass, metal, paper, plastic and wood (including monolithic, engineered and veneered wood), and other substrates that will be apparent to persons having ordinary skill in the art.

Test Methods

Rub-up Test: The base paint or stain to be tested is placed in a tared glass jar equipped with a lidded closure, closed and weighed. The inside of the lid is coated by turning the jar over and back. The jar is opened and desired amounts of the colorant and optional siccative-free synergist are added based on the weight per gallon of the tinted base (viz., the base after being combined with the colorant and optional siccative-free synergist). The jar is closed and shaken on a HARBIL™ paint shaker for 1 or 3 minutes. The jar is again opened and a plastic pipette whose tip has been cut down by 13 mm (½ inch) is used to remove a sample of tinted material. The pipette is set aside for later drawdown preparation. The jar is again closed and shaken on the paint shaker for an additional 3 minutes, followed by removal of a pipetted sample, and then shaken for another 3 minutes, to provide samples shaken for a total of 1 or 3 minutes, and for a total of 6 or 9 minutes. A portion of the 1 or 3 minute shaken sample is squeezed from the pipette onto the left side of a drawdown card, and a spatula is used to apply a portion of the 6 or 9 minute shaken sample onto the right side of the drawdown card. Using a 4 mil BIRD™ film applicator for pastel, tint and midtone bases, and a 6 mil BIRD film applicator for ultradeep or clear bases, drawdown coating films are prepared and allowed to sit until the coating begins to dry around the edges, normally about 3-5 minutes for latex coatings and most alkyd coatings.

An index finger and mild pressure are employed to make even circular "rub-up" patterns on the upper outside edge of each coated film, applying shear to the coated areas without rubbing through the film, and normally using at least 5 and up to 25 rubs on each coated film. The films are allowed to air dry for 10 minutes and then forced dried in a 49° C. (120° F.) oven for at least 20 minutes. The dried films are compared visually and using a colorimeter to evaluate the extent of rub-up. The visual evaluation can be reported on a pass or fail basis based on the sample shaking time, and the rub-up characteristics can be reported as none, slight light, moderate light, severe light, slight dark, moderate dark, or severe dark rub. The colorimeter evaluation can be reported as the strength difference $\Delta E$ based on measurements of $\Delta CRG$, $\Delta CYB$ and $\Delta L$. Slight to no rub-up may be considered acceptable.

Sand Trail Dry Test: Using a 3 mil bird bar film applicator or wire-wound rod, one or more formulations being examined are applied in side-by-side contiguous 0.08 mm (3 mil) thick wet drawdown films along the long dimension of to a sealed rectangular white chart (e.g., a white LENETA™ chart, available from the Leneta Company). The chart is allowed to dry in the open air for 30 minutes in a conditioned room as described in ASTM D 4946-89 (Reapproved 2003), and desirably at 24° C. and 50% R. H. which represent the midpoints for the conditioned room temperature and humidity called for in the ASTM specification. Using a paper cup, a stream of fine sand (e.g., QUICKRETE™ play sand, available from Lowe's Home Improvement) is then sprinkled from a height of about 2.5 cm (1 in) onto the drawdown films so that a sand "stripe" approximately 5 to 10 mm wide is formed across all tested films. The first strip desirably crosses the films at a region where the films are contiguous to one another, and near the start of the drawdown film paths. Every 15, 30, or 60 minutes, a new sand stripe is dropped onto the drawdown films below (viz., closer to the end of the drawdown film paths) the last sand stripe. This procedure is repeated until past the time at which both drawdown films appear to have fully dried such that sand may no longer adhere. The time at which each sand stripe was applied is marked in the chart margin alongside the corresponding sand stripe. The sand-striped drawdown films are allowed to air dry overnight. The chart is then held vertically and flicked with a fingernail so that loose sand drops away. The drying time is determined to be the time for the last-applied stripe that does not leave any sand on the drawdown film, and the next-earlier time is determined to be the time for which sprinkled sand will adhere to a 0.08 mm (3 mil) thick wet film.

The invention is further described in the following Examples, in which all parts and percentages are by weight unless otherwise indicated. Rub-up tests were performed using various water-only fluid colorants with and without a siccative-free synergist in various commercially available alkyd paints and stains as described in U.S. Patent Application Publication No. 2019/0031489 A1 to Ellsworth et al., which is incorporated by reference in its entirety. The tests showed improved rub-up test characteristics compared to formulations that did not include a synergist material. Some of the test sets were conducted during different parts of the year which may account for some of the variability between the different data sets.

Block Resistance Test: Such testing is used to access whether a coating film or paint film, when applied to two surfaces, will stick to itself on prolonged contact when pressure is applied for a defined period of time. It can be measured by a standard test method, ASTM D4946-89 (Standard Test Method for Blocking Resistance of Architectural Paints) and reported on a scale of 1 to 10 scale where 10 represents no tack and 0 indicates 75-100% seal occurring between the samples.

Pencil Hardness Test: The hardness of cured coatings may be tested using by the pencil method, as described in ASTM D3363 (Standard Test Method for Film Hardness by Pencil Test). Results are reported in terms of the last successful pencil prior to film rupture. Thus, for example, if a coating does not rupture when tested with a 2H pencil, but ruptures when tested with a 3H pencil, the coating is reported to have a pencil hardness of 2H.

Example 1

Synergists 1A-1D were prepared based on the following compositions listed in Table II. Synergists 1A and 1B were prepared siccative-free, Synergist 1C included Cobalt Hydrocure II 5%, Manganese 12%, and Zirconium Hydrochem 12% siccatives. Synergist 1D contained Borchi® OXY-Coat (iron-based siccative).

TABLE II

|  | Wt. % |
|---|---|
| Synergist 1A | |
| Rhodacal VS1 Surfactant | 44.50 |
| Rhodafac RS-710 Surfactant | 33.33 |
| Dioctyl Maleate Cosolvent | 22.17 |
| Synergist 1B | |
| Rhodacal 330 Surfactant | 66.08 |
| Rhodoline ASP-100 Surfactant | 2.20 |
| Dioctyl Maleate Cosolvent | 29.74 |
| Potassium Hydroxide | 1.98 |
| Synergist 1C | |
| Rhodacal 330 Surfactant | 76.67 |
| Dioctyl Maleate Cosolvent | 13.22 |
| Byk 7410ET | 2.24 |
| Cobalt Hydrocure II 5% | 1.42 |
| Manganese 12% | 0.59 |
| Zirconium Hydro-chem 12% | 5.86 |
| Synergist 1D | |
| Stepan Biosoft N-411 | 76.68 |
| Borchi Oxy Coat | 4.26 |
| Propylene Glycol | 16.82 |
| Byk 7410ET | 2.24 |

Example 2

A study of the cure rate of various commercially available tinted oil-based paints was performed comparing CCA NOVOCOLOR II universal colorants to CCA NOVOCOLOR HP II water-only colorants+Synergist 1A (siccative-free). The test results for a Sand Trail Dry Time test examining the dry times for the commercially available oil-based alkyd paints was significantly extended (impedance of cure) when using CCA NOVOCOLOR HP II water-only colorants+Synergist 1A compared to when tinted with CCA NOVOCOLOR II Universal colorants. The test results are listed in Table III:

TABLE III

| Description | oz color | Colorant | oz/gal Synergist 1A | Sand Trail Dry Time |
|---|---|---|---|---|
| Wattyl White Alkyd WS1 | 2 | untinted base paint | n/a | 3.5 hr |
|  |  | 8832 NovoColor II Universal Blue | n/a | 3.5 hr |
|  |  | 8632 NovoColor HP II Water-Only Blue | 2.25 | 6 hr |
|  |  | 8878 NovoColor II Universal Yellow Oxide | n/a | 3.5 hr |
|  |  | 8678 NovoColor HP II Water-Only Yellow Oxide | 2.25 | 6 hr |
|  |  | 8851 NovoColor II Universal Red | n/a | 3.5 hr |
|  |  | 8651 NovoColor HP II Water-Only Red | 2.25 | 6 hr |
|  |  | 8835 NovoColor II Universal Red Oxide | n/a | 3.5 hr |
|  |  | 8635 NovoColor HP II Water-Only Red Oxide | 2.25 | 6 hr |

TABLE III-continued

| Description | oz color | Colorant | oz/gal Synergist 1A | Sand Trail Dry Time |
|---|---|---|---|---|
| Wattyl White Alkyd WS6 | 2 | untinted base paint | n/a | 2 hr |
| | | 8832 NovoColor II Universal Blue | n/a | 2.5 hr |
| | | 8632 NovoColor HP II Water-Only Blue | 2.25 | 6 hr |
| | | 8878 NovoColor II Universal Yellow Oxide | n/a | 2.5 hr |
| | | 8678 NovoColor HP II Water-Only Yellow Oxide | 2.25 | 6 hr |
| | | 8851 NovoColor II Universal Red | n/a | 2.5 hr |
| | | 8651 NovoColor HP II Water-Only Red | 2.25 | 6 hr |
| | | 8835 NovoColor II Universal Red Oxide | n/a | 2 hr |
| | | 8635 NovoColor HP II Water-Only Red Oxide | 2.25 | 5 hr |
| Kelly Moore Weathershield Alkyd 1275-122 | 4 | untinted base paint | n/a | 7 hr |
| | | 8832 NovoColor II Universal Blue | n/a | 7 hr |
| | | 8632 NovoColor HP II Water-Only Blue | 2.25 | 8+ hr |
| | | 8878 NovoColor II Universal Yellow Oxide | n/a | 6 hr |
| | | 8678 NovoColor HP II Water-Only Yellow Oxide | 2.25 | 8+ hr |
| | | 8851 NovoColor II Universal Red | n/a | 6 hr |
| | | 8651 NovoColor HP II Water-Only Red | 2.25 | 8+ hr |
| | | 8835 NovoColor II Universal Red Oxide | n/a | 8+ hr |
| | | 8635 NovoColor HP II Water-Only Red Oxide | 2.25 | 8+ hr |

The tests showed an increased duration of cure for formulations that included the water-only colorant and synergist 1A (siccative-free) compared to the base paint (untinted) or base paint plus universal colorant.

Example 3

An experiment was conducted to examine how the amount of siccative added to a sample synergist formulation modifies the cure rate of a tinted oil-based paint. Wattyl White Alkyd WS1 was tested with and without Synergist 1B (siccative-free) added to the composition and with various amounts of Borchi OXY-Coat (iron-based siccative) added to the formulations along with Synergist 1B. The Sand Trail Dry Times were examined with results are shown in Table IV:

TABLE IV

| Sample No. | Composition | Sand Trail Dry Time |
|---|---|---|
| 1 | Wattyl White Alkyd (WS1) w/o synergist or colorant (33% resin solids) | 6.5 hr |
| 2 | WS1 + 2.5 oz/gal Synergist 1B | 8.5+ hr |
| 3 | WS1 + 2.5 oz/gal Synergist 1B + 1% Borchi OXY-Coat based on total resin solids | 6.5 hr |
| 4 | WS1 + 2.5 oz/gal Synergist 1B + 2% Borchi OXY-Coat based on total resin solids | 5 hr |
| 5 | WS1 + 2.5 oz/gal Synergist 1B + 3% Borchi OXY-Coat based on total resin solids | 4.5 hr |
| 6 | WS1 + 2.5 oz/gal Synergist 1B + 4% Borchi OXY-Coat based on total resin solids | 4 hr |

The results showed the inclusion of Borchi OXY-Coat reduced the dry time for formulations compared to those with only Synergist 1B.

Example 4

A study of the cure rate of tinted oil-based paint Wattyl White Alkyd WS1 was performed comparing the Sand Trail Dry Time for WS1 with CCA NOVOCOLOR II universal colorants to CCA NOVOCOLOR HP II water-only colorants+Synergist 1C containing a siccative. The test results showed that water-only colorants+Synergist 1C exhibited comparable dry times compared to CCA NOVOCOLOR II universal colorants. The test results are listed in Table V:

TABLE V

| Sample No. | Composition | Sand Trail Dry Time |
|---|---|---|
| 1 | Wattyl White Alkyd WS1 no synergist | 6 hr |
| 2 | WS1 + 2 oz/gal 8851 NovoColor II Universal Red | 6 hr |
| 3 | WS1 + 2 oz/gal 8651 NovoColor HP II Water-Only Red + 2.25 oz/gal Synergist 1C | 6 hr |

Example 5

A study of the cure rate of various commercially available tinted oil-based paints was performed comparing CCA NOVOCOLOR II universal colorants to CCA NOVOCOLOR HP II water-only colorants+Synergist 1D containing a siccative. The test results for a Sand Trail Dry Time test examining the dry times for the commercially available oil-based alkyd paints showed that water-only colorants+Synergist 1D exhibited comparable dry times compared to CCA NOVOCOLOR II universal colorants. The test results are listed in Table VI:

TABLE VI

| Description | oz color | Colorant | oz/gal Synergist 1D | Sand Trail Dry Time (hr) |
|---|---|---|---|---|
| Wattyl Alkyd White WS1 | 2 | n/a | n/a | 4.5 |
| | | 8813 NovoColor II Universal Yellow | n/a | 4 |
| | | 8613 NovoColor HP II Water-Only Yellow | 2.25 | 5.5 |
| | | 8821 NovoColor II Universal Green | n/a | 4.5 |
| | | 8621 NovoColor HP II Water-Only Green | 2.25 | 5.5 |

TABLE VI-continued

| Description | oz color | Colorant | oz/gal Synergist 1D | Sand Trail Dry Time (hr) |
|---|---|---|---|---|
| | | 8851 NovoColor II Universal Red | n/a | 5 |
| | | 8651 NovoColor HP II Water-Only Red | 2.25 | 5 |
| | | 8878 NovoColor II Universal Yellow Oxide | n/a | 4.5 |
| | | 8678 NovoColor HP II Water-Only Yellow Oxide | 2.25 | 4.5 |
| | | 8891 NovoColor II Universal Black | n/a | 6 |
| | | 8691 NovoColor HP II Water-Only Black | 2.25 | 6 |
| Behr Oil Based White 3800 | 2 | n/a | n/a | 2 hr |
| | | 8813 NovoColor II Universal Yellow | n/a | 6.5 |
| | | 8613 NovoColor HP II Water-Only Yellow | 2.25 | 4 |
| | | 8821 NovoColor II Universal Green | n/a | 6.5 |
| | | 8621 NovoColor HP II Water-Only Green | 2.25 | 5 |
| | | 8851 NovoColor II Universal Red | n/a | 7 |
| | | 8651 NovoColor HP II Water-Only Red | 2.25 | 4 |
| | | 8878 NovoColor II Universal Yellow Oxide | n/a | 7 |
| | | 8678 NovoColor HP II Water-Only Yellow Oxide | 2.25 | 3.5 |
| | | 8891 NovoColor II Universal Black | n/a | 7.5 |
| | | 8691 NovoColor HP II Water-Only Black | 2.25 | 4 |
| Behr Oil Based Clear 3830 | 12 | n/a | n/a | 4.5 |
| | | 8813 NovoColor II Universal Yellow | n/a | 10 |
| | | 8613 NovoColor HP II Water-Only Yellow | 2.25 | 10 |
| | | 8821 NovoColor II Universal Green | n/a | 10 |
| | | 8621 NovoColor HP II Water-Only Green | 2.25 | 10 |
| | | 8851 NovoColor II Universal Red | n/a | 10 |
| | | 8651 NovoColor HP II Water-Only Red | 2.25 | 10 |
| | | 8878 NovoColor II Universal Yellow Oxide | n/a | 10 |
| | | 8678 NovoColor HP II Water-Only Yellow Oxide | 2.25 | 10 |
| | | 8891 NovoColor II Universal Black | n/a | 10 |
| | | 8691 NovoColor HP II Water-Only Black | 2.25 | 10 |

Example 6

The Samples tested in Example 5 were also examined for their average Block resistance at room temperature (approximately 25° C.) and at approximately 120° F. (e.g., approximately 49° C.). The results are shown in Table VII:

TABLE VII

| Description | oz color | Colorant | oz/gal Synergist 1D | Block Rst. (RT) | Block Rst. (120 F.) |
|---|---|---|---|---|---|
| Wattyl Alkyd White WS1 | 2 | n/a | n/a | 10 | 9 |
| | | 8813 NovoColor II Universal Yellow | n/a | 10 | 9 |
| | | 8613 NovoColor HP II Water-Only Yellow | 2.25 | 10 | 9 |
| | | 8821 NovoColor II Universal Green | n/a | 10 | 9 |
| | | 8621 NovoColor HP II Water-Only Green | 2.25 | 10 | 9 |
| | | 8851 NovoColor II Universal Red | n/a | 10 | 9 |
| | | 8651 NovoColor HP II Water-Only Red | 2.25 | 10 | 9 |
| | | 8878 NovoColor II Universal Yellow Oxide | n/a | 10 | 9 |
| | | 8678 NovoColor HP II Water-Only Yellow Oxide | 2.25 | 10 | 9 |
| | | 8891 NovoColor II Universal Black | n/a | 10 | 9 |
| | | 8691 NovoColor HP II Water-Only Black | 2.25 | 10 | 9 |
| Behr Oil Based White 3800 | 2 | n/a | n/a | 9 | 7 |
| | | 8813 NovoColor II Universal Yellow | n/a | 9 | 5 |
| | | 8613 NovoColor HP II Water-Only Yellow | 2.25 | 9 | 5 |
| | | 8821 NovoColor II Universal Green | n/a | 9 | 5 |
| | | 8621 NovoColor HP II Water-Only Green | 2.25 | 9 | 5 |
| | | 8851 NovoColor II Universal Red | n/a | 9 | 5 |
| | | 8651 NovoColor HP II Water-Only Red | 2.25 | 9 | 5 |
| | | 8878 NovoColor II Universal Yellow Oxide | n/a | 9 | 5 |
| | | 8678 NovoColor HP II Water-Only Yellow Oxide | 2.25 | 9 | 5 |
| | | 8891 NovoColor II Universal Black | n/a | 9 | 5 |
| | | 8691 NovoColor HP II Water-Only Black | 2.25 | 9 | 5 |
| Behr Oil Based Clear 3830 | 12 | n/a | n/a | 9 | 5 |
| | | 8813 NovoColor II Universal Yellow | n/a | 7 | 3 |
| | | 8613 NovoColor HP II Water-Only Yellow | 2.25 | 8 | 3 |
| | | 8821 NovoColor II Universal Green | n/a | 7 | 3 |
| | | 8621 NovoColor HP II Water-Only Green | 2.25 | 8 | 3 |
| | | 8851 NovoColor II Universal Red | n/a | 7 | 3 |
| | | 8651 NovoColor HP II Water-Only Red | 2.25 | 7 | 3 |
| | | 8878 NovoColor II Universal Yellow Oxide | n/a | 5 | 3 |
| | | 8678 NovoColor HP II Water-Only Yellow Oxide | 2.25 | 8 | 5 |

TABLE VII-continued

| Description | oz color | Colorant | oz/gal Synergist 1D | Block Rst. (RT) | Block Rst. (120 F.) |
|---|---|---|---|---|---|
| | | 8891 NovoColor II Universal Black | n/a | 6 | 3 |
| | | 8691 NovoColor HP II Water-Only Black | 2.25 | 7 | 3 |

The results demonstrated that the compositions containing water-only colorant, synergist, and siccative exhibited scores comparable or better than those of comparative examples including universal colorants. Scores of 9 or 10 represent trace or no tack occurring and are considered to have excellent or prefect performance characteristics.

Example 7

The Samples tested in Example 5 were also examined for their pencil hardness. The results are shown in Table VIII:

TABLE VIII

| Description | oz color | Colorant | oz/gal Synergist 1D | Pencil Hardness |
|---|---|---|---|---|
| Wattyl Alkyd White WS1 | 2 | n/a | n/a | F-H 55 |
| | | 8813 NovoColor II Universal Yellow | n/a | F-H 55 |
| | | 8613 NovoColor HP II Water-Only Yellow | 2.25 | F-H 55 |
| | | 8821 NovoColor II Universal Green | n/a | F-H 55 |
| | | 8621 NovoColor HP II Water-Only Green | 2.25 | F-H 55 |
| | | 8851 NovoColor II Universal Red | n/a | F-H 55 |
| | | 8651 NovoColor HP II Water-Only Red | 2.25 | F-H 55 |
| | | 8878 NovoColor II Universal Yellow Oxide | n/a | F-H 55 |
| | | 8678 NovoColor HP II Water-Only Yellow Oxide | 2.25 | F-H 55 |
| | | 8891 NovoColor II Universal Black | n/a | F-H 55 |
| | | 8691 NovoColor HP II Water-Only Black | 2.25 | F-H 55 |
| Behr Oil Based White 3800 | 2 | n/a | n/a | 3B-2B 35 |
| | | 8813 NovoColor II Universal Yellow | n/a | 3B-2B 35 |
| | | 8613 NovoColor HP II Water-Only Yellow | 2.25 | 3B-2B 35 |
| | | 8821 NovoColor II Universal Green | n/a | 3B-2B 35 |
| | | 8621 NovoColor HP II Water-Only Green | 2.25 | 3B-2B 35 |
| | | 8851 NovoColor II Universal Red | n/a | 3B-2B 35 |
| | | 8651 NovoColor HP II Water-Only Red | 2.25 | 3B-2B 35 |
| | | 8878 NovoColor II Universal Yellow Oxide | n/a | 3B-2B 35 |
| | | 8678 NovoColor HP II Water-Only Yellow Oxide | 2.25 | 3B-2B 35 |
| | | 8891 NovoColor II Universal Black | n/a | 3B-2B 35 |
| | | 8691 NovoColor HP II Water-Only Black | 2.25 | 3B-2B 35 |
| Behr Oil Based Clear 3830 | 12 | n/a | n/a | 3B-2B 35 |
| | | 8813 NovoColor II Universal Yellow | n/a | 3B-2B 35 |
| | | 8613 NovoColor HP II Water-Only Yellow | 2.25 | 3B-2B 35 |
| | | 8821 NovoColor II Universal Green | n/a | 3B-2B 35 |
| | | 8621 NovoColor HP II Water-Only Green | 2.25 | 3B-2B 35 |
| | | 8851 NovoColor II Universal Red | n/a | 3B-2B 35 |
| | | 8651 NovoColor HP II Water-Only Red | 2.25 | 3B-2B 35 |
| | | 8878 NovoColor II Universal Yellow Oxide | n/a | 3B-2B 35 |
| | | 8678 NovoColor HP II Water-Only Yellow Oxide | 2.25 | 3B-2B 35 |
| | | 8891 NovoColor II Universal Black | n/a | 3B-2B 35 |
| | | 8691 NovoColor HP II Water-Only Black | 2.25 | 3B-2B 35 |

The results demonstrated that the compositions containing water-only colorant, synergist, and siccative exhibited a comparable pencil hardness as compared to the base paint and base paint containing universal colorant.

Example 8

Ace Royal polyurethane alkyd enamel No. 245A320 from Ace Hardware Corporation is tested with CCA NOVOCOLOR HP II water-only colorant alone, with Synergist 1A (siccative-free), and with Synergist 1D (containing a siccative). The alkyd enamel will show a reduced drying time under a Sand Trail Dry Test using Synergist 1D compared to both the water-only colorant alone and the water-only colorant combined with Synergist 1A.

Example 9

Oil-based Cabot Semi-Transparent deck and siding stain No. 0306 from The Valspar Corporation is tested with CCA NOVOCOLOR HP II water-only colorant alone, with Synergist 1A (siccative-free), and with Synergist 1D (containing a siccative). The oil-based stain will show a reduced drying time under a Sand Trail Dry Test using Synergist 1D compared to both the water-only colorant alone and the water-only colorant combined with Synergist 1A.

Example 10

WEATHER-SHIELD alkyd base paint from Kelly-Moore Co. is tested with CCA NOVOCOLOR HP II water-only colorant alone, with Synergist 1A (siccative-free), and with Synergist 1D (containing a siccative). The paint will show a reduced drying time under a Sand Trail Dry Test using Synergist 1D compared to both the water-only colorant alone and the water-only colorant combined with Synergist 1A.

Example 11

PERMO-PAVE™ alkyd base paint from Wattyl Australia Pty. Ltd. is tested with CCA NOVOCOLOR HP II water-only colorant alone, with Synergist 1A (siccative-free), and with Synergist 1D (containing a siccative). The paint will show a reduced drying time under a Sand Trail Dry Test using Synergist 1D compared to both the water-only colorant alone and the water-only colorant combined with Synergist 1A.

Example 12

ACE GREAT FINISHES oil-based wood stain from Ace Hardware Corp. is tested with CCA NOVOCOLOR HP II water-only colorant alone, with Synergist 1A (siccative-free), and with Synergist 1D (containing a siccative). The oil-based stain will show a reduced drying time under a Sand Trail Dry Test using Synergist 1D compared to both the water-only colorant alone and the water-only colorant combined with Synergist 1A.

Example 13

MCCORMICK oil-based wood stain from McCormick Paints is tested with CCA NOVOCOLOR HP II water-only colorant alone, with Synergist 1A (siccative-free), and with Synergist 1D (containing a siccative). The oil-based paint will show a reduced drying time under a Sand Trail Dry Test using Synergist 1D compared to both the water-only colorant alone and the water-only colorant combined with Synergist 1A.

The invention is further illustrated by the following embodiments:

1. A point-of-sale custom color system for tinting base paints and stains, the system comprising:
   a) an array of water-only fluid colorants including at least white, green, blue and red colorants comprising one or more pigments or dyes and a surface treatment, the colorants being packaged in containers with a volume of about 0.5 to about 5 L and from which colorant is gravimetrically or volumetrically dispensed via an automated or manual colorant dispenser into a base paint or stain with a volume of about 0.2 to 20 L;
   b) at least one siccative; and
   c) at least one synergist containing, primarily or exclusively, one or more ingredients that will disperse the water-only colorants into solvent-borne base paints or stains.

2. A system according to embodiment 1, further comprising at least one water-borne base paint or stain and at least one solvent-borne base paint or stain, the base paints or stains being packaged in largely but incompletely filled point-of-sale containers with a volume of 0.2 to 20 L equipped with an openable and recloseable lid, cap or other closure for an opening through which colorant may be dispensed from the automated or manual colorant dispenser into the base paint or stain.

3. A system according to embodiment 2, wherein the at least one solvent-borne base paint or stain is siccative-free.

4. A system according to embodiment 1, further comprising the automated or manual colorant dispenser.

5. A system according to embodiment 1, wherein the at least one siccative and at least one synergist are pre-mixed together and disposed in at least one dispenser slot normally reserved for a colorant in an automated colorant dispenser, and dispensed into the solvent-borne base paint or stain using an automated colorant dispenser metering circuit.

6. A system according to embodiment 1, wherein the at least one siccative and the at least on synergist are stored in separate dispenser slots on the system.

7. A system according to embodiment 1, The system according to claim 1, wherein the at least one siccative comprises a primary metal drier, a through metal drier, an auxiliary metal drier, or a combination thereof.

8. A system according to embodiment 7, wherein the at least one siccative comprises a primary metal drier, wherein the metal is selected from the list consisting of cobalt, manganese, iron, and vanadium.

9. A system according to embodiment 7, wherein the at least one siccative comprises a through metal drier, wherein the metal is selected from the list consisting of aluminum, cerium, lithium, neodymium, potassium, strontium, and zirconium.

10. A system according to embodiment 7, wherein the at least one siccative comprises an auxiliary metal drier, wherein the metal is selected from the list consisting of calcium, barium, and zinc.

11. A system according to embodiment 1, wherein the at least one siccative and the at least one synergist are in a pre-mixed mixture and stored in at least one container on the system, wherein the mixture comprises at least about 1 wt. % of the one or more siccatives.

12. A system according to embodiment 11, wherein the contained is a metal or plastic box, can, cartridge, jar, pouch, squeeze bottle, syringe or collapsible tube.

13. A method for point-of-sale custom paint or stain tinting, the method comprising using an automated or manual colorant dispenser to dispense into water-borne and solvent-borne base paints or stains at a retail, wholesale or combined retail/wholesale outlet one or more water-only fluid colorants selected from an array of colorants including at least white, black, red, green and blue water-only colorants comprising one or more pigments or dyes and a surface treatment, and further comprising adding at least one siccative at the point-of-sale to the solvent-borne base paint or stain and adding to or including in the solvent-borne base paints or stains at least one synergist comprising at least one or more ingredients that will disperse the water-only colorants into such solvent-borne base paints or stain.

14. A method according to embodiment 13, wherein the synergist is added to the solvent-borne base paint or stain before dispensing any of the one or more water-only fluid colorants into such solvent-borne base paint or stain.

15. A method according to embodiment 13, wherein the synergist is added to the solvent-borne base paint or stain before or at the same time the one or more siccatives are added to the solvent-borne base paint or stain.

16. A method according to embodiment 13, wherein the solvent-borne base paints or stains do not already include sufficient ingredients from the synergist to disperse the water-only fluid colorants into such solvent-borne base paint or stains without causing objectionable rub-up.

17. A method according to embodiment 13, wherein the synergist and siccative are provided separate from the solvent-borne base paint or stain, the method further comprising mixing the synergist and siccative with the solvent-borne base paint or stain.

18. A system or method according to any preceding embodiment, wherein the synergist and siccative are pre-mixed together and disposed in one or more tinting machine dispenser slots normally reserved for a colorant, and dispensed into the base paint or stain using a tinting machine metering circuit.

19. A system or method according to any preceding embodiment, wherein water-only fluid colorants are used whenever tinting a water-borne base paint or stain, and water-only fluid colorants and the synergist and siccative are used whenever tinting a solvent-borne base paint or stain.

20. A system or method according to any preceding embodiment, wherein the array includes one or more yellow and one or more colored oxide colorants.

21. A system or method according to any preceding embodiment, wherein the synergist comprises the at least one surfactant, optional dispersing agent and optional cosolvent.

22. A system or method according to any preceding embodiment, wherein the synergist comprises a combination of two or more surfactants that provides improved compatibility across a range of base paints or stains or within an array of water-only fluid colorants.

23. A system or method according to any preceding embodiment, wherein the synergist comprises a nonionic surfactant.

24. A system or method according to any preceding embodiment, wherein the synergist comprises dioctyl maleate, tributyl citrate, a dihydric or polyhydric alcohol, a polyether, a modified polyurea, a polyalkylene oxide or a combination thereof.

25. A system or method according to any preceding embodiment, wherein the synergist comprises a compound having the formula I shown below:

$$R_1O(C(O))_mA(R_3)(R_4)(C(O))_nR_2 \quad \text{I}$$

wherein: A is a divalent $C_1$-$C_{10}$ alkyl, $C_2$-$C_{10}$ alkylene or $C_3$-$C_{10}$ cycloalkyl radical;

$R_3$ and $R_4$ are independently H, substituted or unsubstituted $C_1$-$C_6$ alkyl, substituted or unsubstituted $C_3$-$C_6$ cycloalkyl, —$OR_5$ or $C(O)OR_5$ radicals, wherein $R_5$ is H or a substituted or unsubstituted $C_1$-$C_6$ alkyl, substituted or unsubstituted $C_3$-$C_6$ cycloalkyl, or $C_1$-$C_6$ alkoxy radical;

$R_1$ and $R_2$ are independently H, —C═O, or a substituted or unsubstituted $C_1$-$C_6$ alkyl radical;

m is 0 or 1; and n is 0 or 1.

26. A system or method according to any preceding embodiment, wherein the synergist comprises a dispersing agent.

27. A system or method according to any preceding embodiment, wherein the synergist comprises a cosolvent.

28. A system or method according to any preceding embodiment, wherein the synergist and siccative are premixed together and the resultant mixture comprises at least about 65 wt. % of siccatives and surfactants.

29. A system or method according to any preceding embodiment, wherein the synergist consists essentially of a surfactant, dispersing agent, cosolvent and an optional rheology modifier.

30. A system or method according to any preceding embodiment, wherein the at least one siccative comprises a primary metal drier, a through metal drier, an auxiliary metal drier, or a combination thereof.

31. A system or method according to any preceding embodiment, wherein the synergist and siccative are contained in a metal or plastic box, can, cartridge, jar, pouch, squeeze bottle, syringe or collapsible tube.

32. A system or method according to any preceding embodiment, wherein the amount and type of synergist added to the solvent-borne base paint or stain is the same whenever a solvent-borne base paint or stain is tinted.

33. A system or method according to any preceding embodiment, wherein the system comprises a first mixture comprising a first synergist and a first siccative configured to be added for the creation of light colored paints or stains, and a second mixture different than the first mixture, the second mixture comprising a second synergist and a second siccative and configured to be added for the creation of dark colored paints or stains, wherein the first and second mixtures are independently dispensable into a solvent-borne base paint or stain.

34. A system or method according to any preceding embodiment, wherein the amount or type of synergist added to the solvent-borne base paint or stain varies depending on the amount of colorant to be dispensed.

35. A system or method according to any preceding embodiment, wherein all of the colorants in the array and in the colorant dispenser are water-only fluid colorants.

36. A system or method according to any preceding embodiment, wherein less than two of the colorants in the array and in the colorant dispenser are compatible with alkyd paints and stains, and the remaining colorants in the array will exhibit visually objectionable rub-up if dispensed into such alkyd paints and stains in representative tinting amounts of 1 to 15% of the alkyd paint or stain container volume.

37. A system or method according to any preceding embodiment, wherein the synergist provides at least a 10% reduction in the Sand Trail Dry Time for the tinted solvent-borne paint or stain compared to a comparable tinted solvent-borne paint or stain containing a siccative-free synergist.

38. A system or method according to any preceding embodiment, wherein the solvent-borne base paint or stain is a paint.

39. A system or method according to any preceding embodiment, wherein the solvent-borne base paint or stain comprises an alkyd paint.

40. A system or method according to any preceding embodiment, wherein the solvent-borne base paint or stain comprises a polyurethane paint.

41. A system or method according to any preceding embodiment, wherein the solvent-borne base paint or stain comprises an epoxy paint.

42. A system or method according to any preceding embodiment, wherein the solvent-borne base paint or stain is an oil-based stain.

43. An article comprising container housing a mixture for use in a point-of-sale custom color system for tinting base paints and stains, the mixture comprising, primarily or exclusively, one or more siccatives and one or more synergists, the one or more synergists comprising, primarily or exclusively, one or more ingredients that will disperse the water-only colorants into solvent-borne base paints or stains.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A point-of-sale custom color system for tinting base paints and stains, the system comprising:
   a) an array of water-only fluid colorants including at least white, green, blue and red colorants comprising one or more pigments or dyes and a surface treatment, the colorants being packaged in containers with a volume of about 0.5 to about 5 L and from which colorant is gravimetrically or volumetrically dispensed via an automated or manual colorant dispenser into a base paint or stain with a volume of about 0.2 to 20 L;
   b) at least one siccative; and
   c) at least one synergist containing, primarily or exclusively, one or more ingredients that will disperse the water-only colorants into solvent-borne base paints or stains,
   wherein the at least one siccative and the at least one synergist are in a pre-mixed mixture and stored in a container, wherein the pre-mixed mixture comprises about 0.01 wt. %-20.0 wt. % of the at least one siccative and about 10 wt. % to about 100 wt. % of combined siccatives and surfactants on a dry weight basis,
   wherein the pre-mixed mixture comprises one or more nonionic, anionic, cationic, or amphoteric surfactants, and one or more glycols, glycol ethers, alcohols, esters, and ester alcohols, and
   wherein after the siccative is added to or dispersed within the base paint or stain, the paint or stain comprises about 0.5 wt. % to about 10 wt. % total siccative based on dry solids of the base paint or stain.

2. The point-of-sale custom color system according to claim 1, further comprising at least one water-borne base paint or stain and at least one solvent-borne base paint or stain, the base paints or stains being packaged in largely but incompletely filled point-of-sale containers with a volume of about 0.2 to 20 L equipped with an openable and recloseable lid, cap or other closure for an opening through which colorant may be dispensed from the automated or manual colorant dispenser into the base paint or stain.

3. The point-of-sale custom color system according to claim 2, wherein the solvent-borne base paint or stain does not already include sufficient ingredients from the synergist to disperse the water-only fluid colorants into such solvent-borne base paint or stain without causing objectionable rub-up according to the specification.

4. The point-of-sale custom color system according to claim 2, wherein the solvent-borne base paint or stain is siccative-free.

5. The point-of-sale custom color system according to claim 1, wherein the at least one siccative and at least one synergist are pre-mixed together and disposed in at least one dispenser slot normally reserved for a colorant in an automated colorant dispenser, and dispensed into the solvent-borne base paint or stain using an automated colorant dispenser metering circuit.

6. The point-of-sale custom color system according to claim 1, wherein the at least one siccative comprises a primary metal drier, a through metal drier, an auxiliary metal drier, or a combination thereof.

7. The point-of-sale custom color system according to claim 6, wherein the at least one siccative comprises a primary metal drier, wherein the metal is selected from the list consisting of cobalt, manganese, iron, and vanadium.

8. The point-of-sale custom color system according to claim 6, wherein the at least one siccative comprises a through metal drier, wherein the metal is selected from the list consisting of aluminum, cerium, lithium, neodymium, potassium, strontium, and zirconium.

9. The point-of-sale custom color system according to claim 6, wherein the at least one siccative comprises an auxiliary metal drier, wherein the metal is selected from the list consisting of calcium, barium, and zinc.

10. The system according to claim 1, wherein the mixture comprises about 1 wt. % to 20 wt. % of the at least one siccative.

11. The point-of-sale custom color system according to claim 1, wherein the contained is a metal or plastic box, can, cartridge, jar, pouch, squeeze bottle, syringe or collapsible tube.

12. The point-of-sale custom color system according to claim 1, wherein the synergist comprises a dispersing agent and an optional cosolvent.

13. The point-of-sale custom color system according to claim 1, wherein all of the colorants in the array are water-only fluid colorants.

14. The point-of-sale custom color system according to claim 1, wherein the solvent-borne base paint or stain comprises an alkyd paint, polyurethane paint, epoxy paint or oil-based stain.

15. The point-of-sale custom color system according to claim 1, wherein the system comprises a first mixture comprising a first synergist and a first siccative configured to be added for the creation of light colored paints or stains, and a second mixture different than the first mixture, the second mixture comprising a second synergist and a second siccative and configured to be added for the creation of dark colored paints or stains, wherein the first and second mixtures are independently dispensable into a solvent-borne base paint or stain.

16. A method for point-of-sale custom paint or stain tinting, the method comprising using an automated or manual colorant system to dispense into water-borne and solvent-borne base paints or stains at a retail, wholesale or combined retail/wholesale outlet, one or more water-only fluid colorants at least one siccative and at least one synergist the system comprising:
   a) an array of the water-only fluid colorants including at least white, green, blue and red colorants comprising one or more pigments or dyes and a surface treatment, the colorants being packaged in containers with a volume of about 0.5 to about 5 L and from which colorant is gravimetrically or volumetrically dispensed via an automated or manual colorant dispenser into a base paint or stain with a volume of about 0.2 to 20 L; the at least one siccative; and
   b) the at least one synergist containing, primarily or exclusively, one or more ingredients that will disperse the water-only colorants into solvent-borne base paints or stains,
   wherein the at least one siccative and the at least one synergist are in a pre-mixed mixture and stored in a container, wherein the pre-mixed mixture comprises about 0.01 wt. %-20.0 wt. % of the at least one siccative and about 10 wt. % to about 100 wt. % of combined siccatives and surfactants on a dry weight basis,
   wherein the pre-mixed mixture comprises one or more nonionic, anionic, cationic, or amphoteric surfactants, and one or more glycols, glycol ethers, alcohols, esters, and ester alcohols, and
   wherein after the siccative is added to or dispersed within a base paint or stain, the paint or stain comprises about 0.5 wt. % to about 10 wt. % total siccative based on a dry solids basis.

17. The method according to claim 16, wherein the synergist is added to the solvent-borne base paint or stain before dispensing any of the one or more water-only fluid colorants into such solvent-borne base paint or stain.

18. The point-of-sale custom color system of claim 1, wherein the pre-mixed mixture comprises one or more of: ethylene glycol, diethylene glycol, glycol ether, n-propanol, isopropanol, n-butanol, isobutanol, 2-methyl butanol, iso-amyl alcohol, amyl alcohol isomer, n-pentanol, 2-ethylhexanol, 4-hydroxy-2,6,8-trimethylnonane, diisobutyl carbinol, isopropyl acetate, n-butyl acetate, isobutyl acetate, n-propyl acetate, and primary amyl acetate mixed isomer.

* * * * *